United States Patent
Frisken

(10) Patent No.: US 10,461,878 B2
(45) Date of Patent: Oct. 29, 2019

(54) POLARIZATION DIVERSE WAVELENGTH SELECTIVE SWITCH

(71) Applicant: Finisar Corporation, Horsham, PA (US)

(72) Inventor: Steven James Frisken, Vaucluse (AU)

(73) Assignee: Finisar Corporation, Horsham, PA (US)

( * ) Notice: Subject to any disclaimer, the term of this patent is extended or adjusted under 35 U.S.C. 154(b) by 0 days.

(21) Appl. No.: 15/482,739

(22) Filed: Apr. 8, 2017

(65) Prior Publication Data

US 2017/0214482 A1 Jul. 27, 2017

Related U.S. Application Data

(63) Continuation of application No. 14/415,124, filed as application No. PCT/US2013/051064 on Jul. 18, 2013, now Pat. No. 9,654,848.

(Continued)

(51) Int. Cl.
*H04J 14/02* (2006.01)
*G02B 6/35* (2006.01)
(Continued)

(52) U.S. Cl.
CPC .......... *H04J 14/0212* (2013.01); *G02B 6/356* (2013.01); *G02B 6/3512* (2013.01);
(Continued)

(58) Field of Classification Search
CPC ............... H04Q 11/0003; H04Q 11/00; H04Q 2011/0016; H04Q 2011/0035;
(Continued)

(56) References Cited

U.S. PATENT DOCUMENTS 5,037,173 A 8/1991 Sampsell et al.
5,440,654 A 8/1995 Lambert
(Continued)

FOREIGN PATENT DOCUMENTS

CN 1774656 A 5/2006
CN 101368848 A 2/2009
(Continued)

OTHER PUBLICATIONS

"Office Action" for Chinese Patent Application No. 2013800384452, dated May 10, 2017, 7 pages, Chinese Patent Office, Hubei, China.
(Continued)

*Primary Examiner* — Oommen Jacob
(74) *Attorney, Agent, or Firm* — Kurt Rauschenbach; Rauschenbach Patent Law Group, LLC

(57) ABSTRACT

Described herein is a wavelength selective switch (WSS) type optical switching device (1) configured for switching input optical beams from input optical fiber ports (3, 5 and 7) to an output optical fiber port (9). Device (1) includes a wavelength dispersive grism element (13) for spatially dispersing the individual wavelength channels from an input optical beam in the direction of a second axis (y-axis). The optical beams propagate from input ports (3, 5 and 7) in a forward direction and are reflected from a liquid crystal on silicon (LCOS) device (11) in a return direction to output port (9). The input optical beams are transmitted through a port selecting module (21), which provides polarization diversity to device (1) and provides capability to restrict optical beams returning from LCOS device (11) from being coupled back into input ports (3, 5 and 7).

14 Claims, 21 Drawing Sheets

Related U.S. Application Data

(60) Provisional application No. 61/673,580, filed on Jul. 19, 2012.

(51) Int. Cl.
*H04J 14/06* (2006.01)
*H04Q 11/00* (2006.01)
*G02B 6/293* (2006.01)

(52) U.S. Cl.
CPC .......... *H04J 14/0221* (2013.01); *H04J 14/06* (2013.01); *H04Q 11/0003* (2013.01); *H04Q 11/0005* (2013.01); *G02B 6/2931* (2013.01); *G02B 6/29373* (2013.01); *G02B 6/3556* (2013.01); *H04Q 2011/0016* (2013.01); *H04Q 2011/0035* (2013.01); *H04Q 2011/0039* (2013.01)

(58) Field of Classification Search
CPC .............. H04Q 11/0005; G02B 6/3512; G02B 6/2931; G02B 6/29373; G02B 6/3556; G02B 6/356; H04J 14/0212; H04J 14/06
USPC .......................... 398/48, 45, 43, 47
See application file for complete search history.

(56) References Cited

U.S. PATENT DOCUMENTS

| | | | |
|---|---|---|---|
| 5,621,829 A | 4/1997 | Ford | |
| 5,647,033 A | 7/1997 | Laughlin | |
| 6,002,818 A | 12/1999 | Fatehi et al. | |
| 6,097,859 A | 8/2000 | Solgaard et al. | |
| 6,498,872 B2 | 12/2002 | Bouevitch et al. | |
| 6,580,846 B1 | 6/2003 | Burroughs et al. | |
| 6,707,959 B2 | 3/2004 | Ducellier et al. | |
| 6,760,511 B2 | 7/2004 | Garrett et al. | |
| 6,810,169 B2 | 10/2004 | Bouevitch | |
| 6,826,330 B1 | 11/2004 | Godil et al. | |
| 6,859,573 B2 | 2/2005 | Bouevitch et al. | |
| 7,014,326 B2 | 3/2006 | Danagher et al. | |
| 7,116,480 B1* | 10/2006 | Li | G02B 27/283 359/484.06 |
| 7,397,980 B2 | 7/2008 | Frisken | |
| 7,725,027 B2* | 5/2010 | Keyworth | G02B 6/12007 398/47 |
| 7,769,255 B2 | 8/2010 | Nagy et al. | |
| 8,081,875 B2 | 12/2011 | Keyworth et al. | |
| 8,190,025 B2 | 5/2012 | Presley et al. | |
| 8,437,634 B2 | 5/2013 | Sakurai | |
| 8,644,705 B2* | 2/2014 | Barbarossa | G02B 6/2931 398/48 |
| 9,654,848 B2* | 5/2017 | Frisken | G02B 6/3512 |
| 2003/0035111 A1* | 2/2003 | Nevis | G02B 27/283 356/484 |
| 2004/0033010 A1 | 2/2004 | McGuire | |
| 2004/0165126 A1 | 8/2004 | Asahi | |
| 2004/0202407 A1 | 10/2004 | Hoke | |
| 2004/0263788 A1* | 12/2004 | Kim | H04N 9/3117 353/20 |
| 2005/0244098 A1 | 11/2005 | Barrett | |
| 2005/0276537 A1* | 12/2005 | Frisken | G02B 6/2713 385/24 |
| 2006/0067611 A1 | 3/2006 | Frisken et al. | |
| 2008/0031627 A1 | 2/2008 | Smith | |
| 2008/0205821 A1 | 8/2008 | Mcguire | |
| 2009/0046288 A1* | 2/2009 | Crafts | G01J 3/18 356/328 |
| 2009/0067780 A1 | 3/2009 | Nishizawa et al. | |
| 2009/0220233 A1 | 9/2009 | Presley et al. | |
| 2011/0085222 A1 | 4/2011 | Komiya | |
| 2011/0234951 A1* | 9/2011 | Cohen | G02B 6/2713 349/113 |
| 2011/0273657 A1 | 11/2011 | Collings et al. | |
| 2015/0208143 A1* | 7/2015 | Frisken | G02B 6/3512 398/48 |

FOREIGN PATENT DOCUMENTS

| | | |
|---|---|---|
| CN | 102460094 A | 5/2012 |
| JP | H04308811 A | 10/1992 |
| JP | H0534714 A | 2/1993 |
| JP | 2002031780 A | 1/2002 |
| JP | 2003066232 A | 3/2003 |
| JP | 2004310104 A | 11/2004 |
| JP | 2005-115377 A | 4/2005 |
| JP | 2009508159 A | 2/2009 |
| JP | 2009063964 A | 3/2009 |
| JP | 2011085688 A | 4/2011 |
| JP | 2012508907 A | 4/2012 |
| WO | 2007/029260 A2 | 3/2007 |
| WO | 2007029260 A2 | 3/2007 |
| WO | 2007029260 A3 | 6/2007 |
| WO | 2011048599 A1 | 4/2011 |

OTHER PUBLICATIONS

"Office Action" for Japanese Patent Application No. 2015-523249, dated Jul. 4, 2017, 6 pages, Japanese Patent Office, Japan.

"Notification Concerning Transmittal of International Preliminary Report on Patentability (Chapter I of the Patent Cooperation Treaty" for PCT/US13/51064, dated Jan. 29, 2015, 14 pages, The International Bureau of WIPO, Geneva, Switzerland.

"International Search Report" for PCT/US13/51064, dated Oct. 25, 2013, 4 pages, ISA/KR, Korean Intellectual Property Office, Daejeon Metropolitan City, Republic of Korea.

Peter, et al., Optical Fiber Switching Device with Active Alignment SPIE, Mar./Apr. 1999, pp. 800-806, vol. 3680, retrieved on May 1, 2016, http://proceedings.spiedigitallibrary.org/.

"European Search Report" for European Patent Application No. 13819233.1, dated Feb. 12, 2016, 7 pages, European Patent Office, Munich, Germany.

* cited by examiner

POLARIZATION DIVERSE WAVELENGTH SELECTIVE SWITCH

CROSS REFERENCE TO RELATED APPLICATION SECTION

The present application is a continuation application of U.S. patent application Ser. No. 14/415,124, filed on Jan. 15, 2015, entitled "Polarization Diverse Wavelength Selective Switch" which is a 35 U.S.C. § 371 application based on International Patent Application No. PCT/US13/51064, filed on Jul. 18, 2013, entitled "Polarization Diverse Wavelength Selective Switch," which claims priority to U.S. Provisional Patent Application number 61/673,580, filed on Jul. 19, 2012, entitled "Polarization Diverse Wavelength Selective Switch." The entire contents of U.S. patent application Ser. No. 14/415,124, International Patent Application No. PCT/US13/51064, and U.S. Provisional Patent Application Number 61/673,580 are herein incorporated by reference.

FIELD OF THE INVENTION

The present invention relates to an optical switching device and in particular to a wavelength selective switch (WSS) implementing polarization manipulation optics. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

With the development of more complex optical networks, the capabilities of optical switching devices are evolving. Switches, such as wavelength selective switches (WSS) are incorporating more input and output ports to manage the increased system demand. Further, WSS devices can be configured to independently route signals from two sources within a single device. In such a configuration, a single WSS device essentially operates as two separate devices. An example of a dual source or "twin" device is described in U.S. Pat. No. 7,397,980 to Frisken, entitled "Dual-source optical wavelength processor" and assigned to Finisar Corporation.

However, constraints on the size of the device generally place limits on the number and location of possible ports and the functionality of the device. Further, with increased port numbers, directivity issues become more prominent as the number of possible switching states gives rise to undesired connectivity between pairs of ports. That is, establishing a particular link between two ports simultaneously establishes links between other pairs of ports. Such undesired links become more common as the number of ports in a switching device increases and also as the number of network switching points increases, particularly in networks utilizing bidirectional dual source WSS devices. Undesired links between ports can establish or enhance multipath interference in the beam along the path and can also cause instability in source transmitters such as lasers.

In the case of dual source devices, the independent routing of a dual source device can be difficult to maintain as the setting up of switching states of a first optical source may simultaneously couple signals to ports intended for the second source. In both single source and dual source devices, this connectivity issue is often addressed by setting up of isolator arrays on the input ports. However, this adds to optical loss, size and cost.

There is a need for improved port isolation in optical switching devices.

In current dual source WSS devices beams from the two sources are propagated separately in space through the optical system. This separation of beams requires larger sized optical components and gives rise to increased physical device size compared to conventional single source devices. Increase component and device size typically leads to increase manufacturing cost.

There is also a need for improved dual source WSS devices.

SUMMARY OF THE INVENTION

It is an object of the invention, in its preferred form to provide an improved or alternative WSS device.

In accordance with a first aspect of the present invention there is provided an optical switching device for processing optical beams with more than one independent wavelength channel, including:
  one or more input ports for inputting optical beams in a forward direction of propagation;
  a switching module for reflecting beams propagating in the forward direction and selectively switching the optical beams along predetermined paths in a return direction of propagation;
  one or more output ports for receiving predetermined optical beams propagating in the return direction; and
  a port selecting module for selectively directing the beams such that predetermined ones of the beams propagating in the return direction propagate along trajectories out of alignment with the input ports.

The port selecting module preferably includes one or more polarizing elements for polarizing the optical beams into a predetermined polarization state. The port selecting module preferably further includes:
  a polarization separation element for spatially separating an optical beam into two orthogonal polarization components; and
  a polarization rotation element for selectively rotating the polarization components with respect to each other.

The polarization separation element preferably includes a birefringent walk-off crystal element.

The input and output ports are preferably disposed in an array extending in a first dimension and the spatial separation of polarization components is in a second dimension perpendicular to the first dimension.

The polarization rotation element preferably includes a Faraday rotator configured to apply a 45° rotation to a polarization component. The polarization rotation element preferably further includes a half-wave plate element configured to rotate a first polarization component in a forward propagation direction and to rotate a second polarization component in a return propagation direction. The first polarization component and the second polarization component are preferably the same component.

The optical switching device preferably includes an optical power element for focusing the polarization components together. The optical switching device preferably includes a second polarization separation element for spatially separating the two orthogonal polarization components in the first dimension.

The polarization rotation element is preferably reconfigurable to allow selectivity to define specific ports as being either an input port or an output port. In one embodiment, the polarization rotation element preferably includes a transmissive liquid crystal element device including a plurality of individually drivable electro-optic cells. Preferably, the electro-optic cells are selectively electrically drivable between two discrete phase states, one phase state configured to couple an optical beam into a predetermined output port and one phase state configured to couple an optical beam away from a predetermined output port.

The optical switching device preferably includes three input ports and one output port.

The optical switching device preferably includes a dispersive element for spatially dispersing the optical beams into a plurality of wavelength channels for independent selective switching of the channels by the switching module.

The optical switching device preferably includes a beam shifting element for selectively applying a spatial shift to the optical beams in the first dimension based on the spatial position and polarization of the beams. In one embodiment, the spatial shift is preferably 125 µm.

In accordance with a second aspect of the present invention, there is provided an optical switching method, including:
- defining one or more input ports for inputting optical beams in a forward direction of propagation;
- reflecting beams propagating in the forward direction and selectively switching the optical beams along predetermined paths in a return direction of propagation;
- defining one or more output ports for receiving predetermined optical beams propagating in the return direction; and
- selectively directing the beams such that beams propagating in the return direction propagate along trajectories out of alignment with the input ports.

In accordance with a third aspect of the present invention, there is provided an optical signal manipulation system including:
- a plurality of ports for carrying a plurality of optical beams to be manipulated, each optical beam including a plurality of independent wavelength channels;
- a polarizing module for polarizing a first group of beams from the series of optical beams into a first polarization state and for polarizing a second group of beams from the series of optical beams into a second polarization state orthogonal to the first state;
- a wavelength dispersion element for spatially separating the plurality of wavelength channels of the first and second groups in the direction of a first dimension; and
- a wavelength manipulation module having:
  - a separation element for spatially separating the plurality of wavelength channels of the first and second groups in the direction of a second dimension orthogonal to the first dimension; and
  - a processing device including a series of independent wavelength processing elements for separately processing each of the separated wavelengths of the first and second group, with wavelength channels of the first group being processed independently of wavelength channels of the second group at a location spatially separated in the second dimension.

The optical signal manipulation system preferably includes a beam confining module for spatially confining the first group of beams with the second group of beams along a direction of propagation to a predefined spatial offset in the first dimension. The spatial offset in the first dimension is preferably 300 µm. The beam confining module preferably includes a polarization beam splitter configured to reflect the first group of beams and transmit the second group of beams.

The beam confining module preferably includes a pair of spatially offset substantially parallel reflective surfaces, a first reflective surface of the pair being positioned to reflect the first group of beams and a second reflective surface of the pair being positioned to reflect the second group of beams. The pair of reflective surfaces preferably are both surfaces of a single prism element.

In one embodiment, the ports are preferably divided into a first group of ports for carrying the first group of beams and a second group of ports for carrying the second group of beams, and wherein the two groups of ports are disposed parallel to each other. In another embodiment, the ports are divided into a first group of ports for carrying the first group of beams and a second group of ports for carrying the second group of beams, and wherein the two groups of ports are disposed at an angle relative to each other.

In accordance with a fourth aspect of the present invention, there is provided a wavelength manipulation device for independently manipulating optical beams from a first and second source, the optical beams having orthogonal polarizations and including a plurality of individual wavelength channels, the device including:
- a separation element for spatially separating the optical beams from the first and second sources by polarization for incidence onto a processing device; and
- a processing device including an array of independently controllable processing elements for separately and independently processing the beams from the first and second sources.

The beams are preferably incident substantially normally onto the processing device. The separating element is preferably configured to receive the beams in a first plane and project them onto the processing device in a second plane relative to the first plane. The second plane is preferably substantially normal to the first plane.

The separation element preferably includes a polarization beam splitter configured to reflect beams from a first source having a first polarization state and to transmit beams from a second source having a second polarization state.

The wavelength manipulation device preferably includes a reflective element configured to reflect beams from the second source onto the processing device.

The separation element preferably includes a half-wave plate positioned for rotating the beams of the first source into the same polarization state as the beams of the second source.

The wavelength manipulation device preferably includes a birefringent wedge for angularly dispersing the beams from each source prior to incidence onto the polarization beam splitter.

In accordance with a fifth aspect of the present invention, there is provided an optical manipulation device, including:
- a polarization separation element for spatially separating at least one input optical beam into first and second orthogonal polarization components;
- a polarization rotation element for rotating the polarization orientation of the first polarization component into the same orientation as the second polarization component;
- at least one directing element for directing the first and second polarization components along substantially parallel but spatially separated output trajectories.

The polarization separation element is preferably a polarization beam splitter. The polarization rotation element is a preferably reflective half-wave plate. The reflective half-wave plate preferably defines, in part, the at least one directing element for directing the first polarization component. The at least one directing element preferably includes an angled mirror for directing the second polarization component.

The optical manipulation device preferably includes a second polarization separation element for angularly separating the at least one input beam into orthogonal polarization components. The second polarization separation element is preferably a birefringent wedge. The second polarization separation element preferably angularly separates the orthogonal polarization components in a dimension perpendicular to the spatial separation performed by the first polarization separation element.

The output trajectories of the polarization components are preferably substantially perpendicular to the trajectory of the at least one input optical beam.

The optical manipulation element preferably includes a processing device having an array of independently controllable processing elements for separately and independently processing the first and second polarization components.

In accordance with a sixth aspect of the present invention, there is provided a wavelength manipulation device for independently manipulating optical beams from a first and second source, the optical beams having orthogonal polarizations and including a plurality of individual wavelength channels, the device including:
  an electrically controllable directing element for simultaneously selectively spatially directing the optical beams from both the first and second sources along predefined trajectories onto a processing device; and
  a processing device including an array of independently controllable processing elements for separately and independently processing the beams from the first and second sources.

The electrically controllable directing element preferably includes a MEMS mirror. In one embodiment, the electrically controllable directing element is preferably configured to vary the predefined trajectories in response to data indicative of a local temperature of the device. In another embodiment, the electrically controllable directing element is preferably responsive to a detected optical reference signal.

In accordance with a seventh aspect of the present invention, there is provided an optical manipulation method, including:
  receiving one or more polarized optical beams at a position along a first axis perpendicular to a propagation direction of the one or more beams;
  applying a spatial shift to the one or more beams along the first axis based on the polarization and position of the one or more beams along the first axis; and
  simultaneously compensating the one or more beams for one or more aberrations based on the position of the one or more beams along the first axis.

BRIEF DESCRIPTION OF THE DRAWINGS

Preferred embodiments of the disclosure will now be described, by way of example only, with reference to the accompanying drawings in which.

DETAILED DESCRIPTION

The techniques and improvements included in the present application will be described in the context of an optical wavelength selective switch (WSS) for switching wavelength channels contained within wavelength division multiplexed (WDM) optical signals. For example, the optical signals may comprise dense wavelength division multiplexed signals including a plurality of individual wavelength channels equally spectrally separated by 50 GHz. However, it will be appreciated that these techniques and improvements are able to be implemented in other types of optical switching and manipulation devices.

General Operation of the WSS Optical Switch

Figure 1:
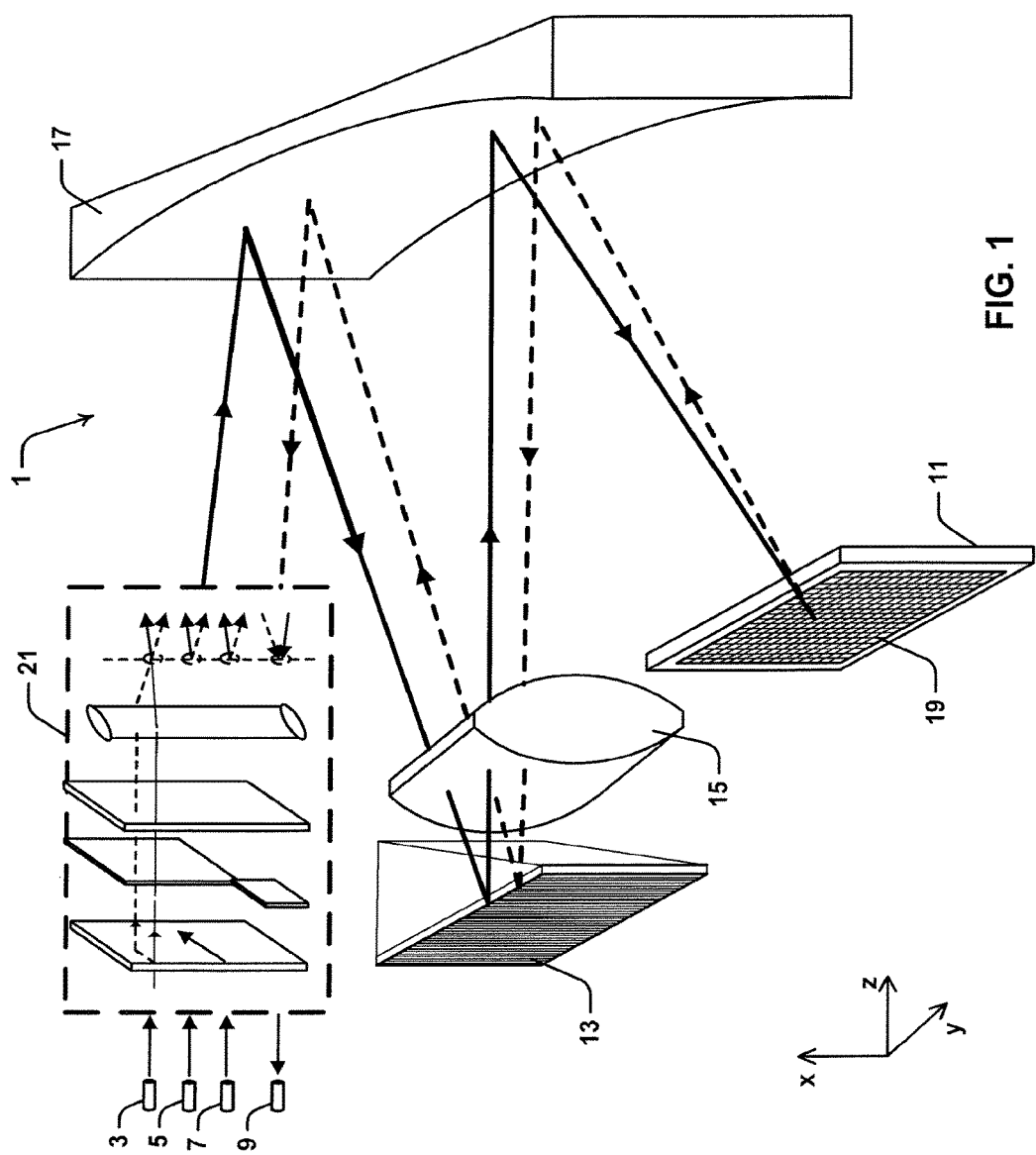
FIG. 1 is a schematic perspective view of a WSS device according to a first embodiment.

Referring initially to FIG. 1, there is illustrated an exemplary WSS optical switching device 1 configured for switching input optical beams from three input optical fiber ports 3, 5 and 7 to an output optical fiber port 9. Ports 3, 5, 7 and 9 are adapted for releasable connection to respective optical fibers (not shown). The optical beams are indicative of WDM optical signals, as mentioned above. On a broad functional level, device 1 performs a similar switching function to that described in U.S. Pat. No. 7,397,980 to Frisken, entitled "Dual-source optical wavelength processor" and assigned to Finisar Corporation, the contents of which are incorporated herein by way of cross-reference. The optical beams propagate from input ports 3, 5 and 7 in a forward direction and are reflected from a liquid crystal on silicon (LCOS) device 11 (described below) in a return direction to output port 9.

Ports 3, 5, 7 and 9 are equally spaced apart along a first axis (x-axis) by a distance of about 250 μm so as to accommodate optical fibers disposed in a fiber v-groove array, which are also equally spaced by 250 μm. In other embodiments, ports 3, 5, 7 and 9 are equally spaced apart in the x-axis by other distances. In further embodiments, ports 3, 5, 7 and 9 are not equally spaced apart in the x-axis. In some embodiments, ports 3, 5 and 7 include micro-lenses for controlling the divergence and profile of the beams exiting or entering the ports from connected optical fibers. In one embodiment, these micro-lenses are mounted to the optical fibers themselves. In another embodiment, the micro-lenses are disposed in an array adjacent the ports in the z-axis or propagation direction. In a further embodiment, micro-lenses are included in a fiber v-groove array disposed along the x-axis.

Device 1 includes a wavelength dispersive grism element 13 for spatially dispersing the individual wavelength channels from an input optical beam in the direction of a second axis (y-axis). Grism element 13 operates in similar a manner to that described in U.S. Pat. No. 7,397,980. That is, to spatially separate the constituent wavelength channels contained within each optical beam in the y-axis according to wavelength. In various embodiments, grism 13 may be formed of suitable materials to provide a low polarization dependent loss or a reduced polarization sensitivity to further enhance the polarization diversity of device 1.

A collimating lens 15 is positioned adjacent to grism 13 such that the optical beams traverse the lens both prior to incidence onto grism 13 and after reflection from the grism. This double pass of lens 15 acts to collimate beams in the x-axis. Similarly, in propagating between input ports 3, 5 and 7 and LCOS device 11, the beams reflect twice off a cylindrical mirror 17. Mirror 17 has appropriate curvature in the y-axis such that each dispersed channel is focused in the y-axis onto the LCOS device. In another embodiment (not shown), focusing in the y-axis is provided by two cylindrical mirrors, each having substantially the same radius of curvature in the y-axis. In further embodiments, the cylindrical mirrors have different radii of curvature.

The dispersed wavelength channels are incident onto LCOS device 11, which acts as a reflective optical manipulation device to independently steer each channel in the x-axis. At the device level, LCOS device 11 operates in a similar manner to that described in U.S. Pat. No. 7,092,599 to Frisken, entitled "Wavelength manipulation system and method" and assigned to Finisar Corporation, the contents of which are incorporated herein by way of cross-reference. However, due to the flexibility available in these devices, LCOS device 11 is also able to be driven in other arrangements, such as in a dual source mode of operation, as described below.

LCOS device 11 includes a two-dimensional array of substantially square-shaped cells 19 formed in a layer of liquid crystal material. In an exemplary embodiment, device 11 includes an array of 1280 by 768 cells. Each cell is independently electrically drivable to impose a relative phase shift to a local region of an incident optical beam. The cells are able to be driven at different relative levels to define a phase profile which manipulates the optical wavefront to selectively steer the beam.

LCOS device 11 steers the wavelength channels at certain angles along predetermined paths in a return direction such that some wavelengths are coupled to output port 9. Other wavelength channels are steered at other angles that couple them away from output port 9, thereby dropping them from the system.

It will be appreciated that in other embodiments, device 1 includes different numbers of input and output ports and is configured to simultaneously couple beams between different input and output ports. In some embodiments, grism 13 is replaced with a diffraction grating or other diffractive device. In some embodiments, LCOS device 11 is replaced with a micro-electromechanical mirror (MEMS) based optical manipulation device or other type of optical manipulation device.

Referring still to FIG. 1, the input optical beams are transmitted through a port selecting module 21, which provides polarization diversity to device 1 and provides capability to restrict optical beams returning from LCOS device 11 from being coupled back into input ports 3, 5 and 7. The operation of port selecting module 21 is described below.

Port Selectivity in the WSS

Figure 2:
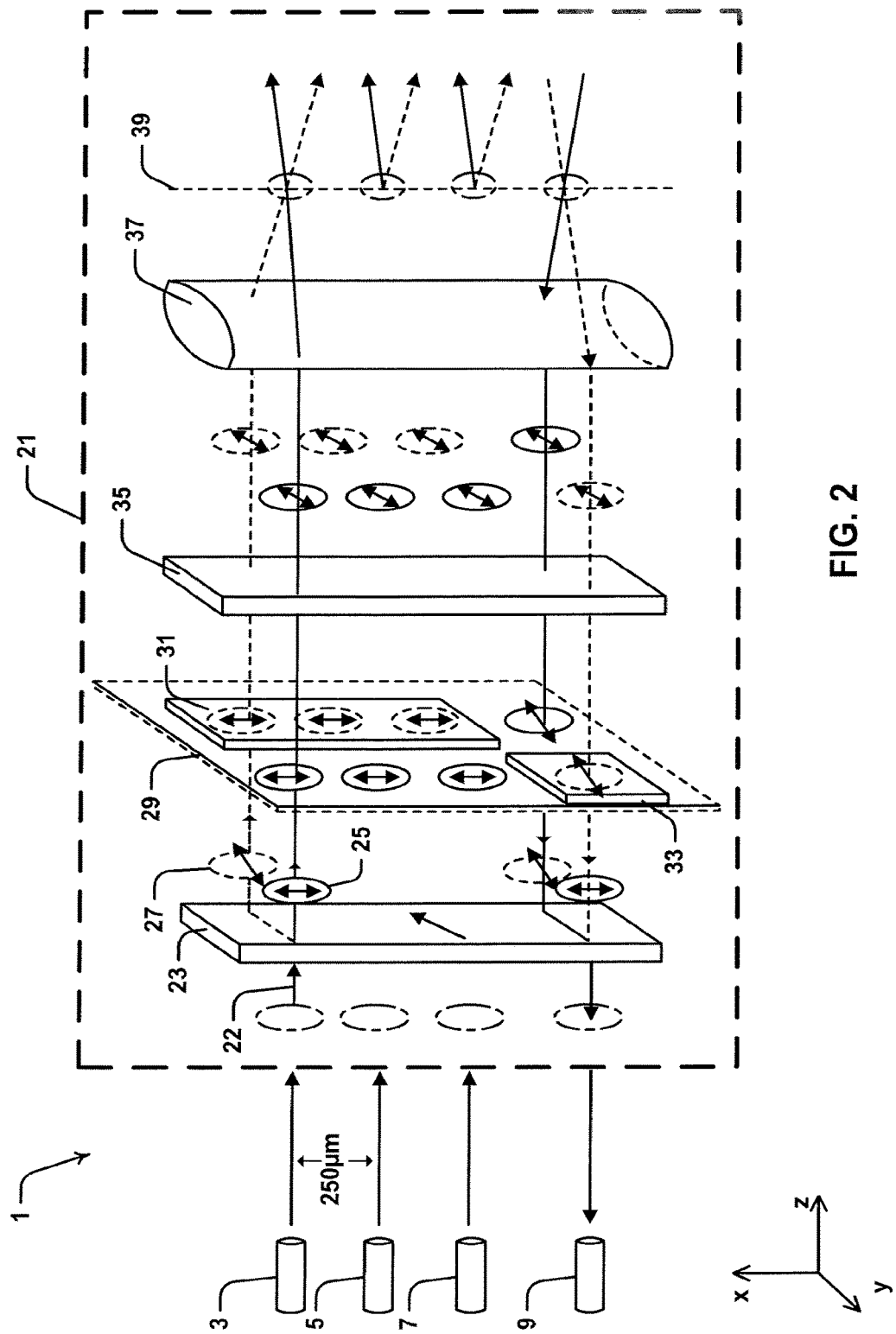
FIG. 2 is a schematic exploded perspective view of a port selecting module for an optical switch, showing polarization states of optical beams throughout the module.

Referring to FIG. 2, there is illustrated a schematic exploded side view of port selecting module 21. In traversing module 21, example optical beam 22 initially passes through a polarization separation element in the form of a birefringent walk-off crystal element 23 for spatially separating in the y-axis an optical beam into two orthogonal polarization components. A first polarization component 25 of each optical beam is designated by solid circles. A second polarization component 27 of each optical beam is designated by dashed circles. The illustrated orientations of the polarization states is exemplary only and it will be appreciated by the skilled person that arbitrary orthogonally polarization states can be generated.

Walk-off element 23 is formed of a birefringent crystalline material that has a material optic axis disposed at an angle relative to the surface normal. Beam components polarized parallel to the crystalline optic axis (parallel to component 27 in the illustrated embodiment) are refracted or walked-off from the original direction of propagation by an amount dependent on the refractive index and thickness of the element. Beam components polarized perpendicular to the crystalline optic axis are unaffected by the material. In preferred embodiments, walk-off element 23 has a thickness in the order of millimeters and provides a spatial separation of polarization components in the order of microns. In the illustrated embodiment, the beams are separated into components having vertical and horizontal orientations and propagating parallel at the output of element 23. However, in other embodiments, element 23 is able to be configured to split the beams into pairs of orthogonal polarization components having any orientation.

In another embodiment, walk-off element 23 is replaced with a birefringent wedge, which angularly separates two orthogonal components by an angle determined by the refractive index and angle of the wedge. In embodiments incorporating birefringent wedges, it is sometimes necessary to angle input ports with respect to output ports or vise-versa in the direction of polarization separation (y-axis).

The beam components output from walk-off element 23 are then passed through a half-wave plate element 29. This element includes birefringent regions 31 and 33 which impose a 180° or π radians phase shift between constituent sub-components of that particular polarization component to rotate the polarization by 90°. Region 31 of element 29 is configured to rotate component 27 propagating in the forward direction by 90°. Component 25 is passed through element 29 without rotation. After passing through element 29, both components propagate in the vertical orientation, as illustrated in FIG. 2. Exemplary birefringent materials that are used to form regions 31 and 33 include calcite, tourmaline, quartz, sodium nitrate, lithium niobate and rutile.

Region 33 of element 29 is configured to rotate component 27 again in the return direction by 90°. However, it will be appreciated that, in other embodiments, the location of regions 31 and 33 can be varied in the y-axis to rotate the other polarization components of each beam. These other embodiments are able to provide the same functionality as that illustrated in FIG. 2. The general requirement is that the location of regions 31 and 33 must be oppositely disposed in the y-axis about the vertical center (x-axis) of element 29 such that the same components rotated in the forward direction are again rotated in the return direction. That is, region 31 may be disposed to the left of region 33 in the y-axis or, alternatively, region 31 may be disposed to the right of region 33 in the y-axis.

The specific location of regions in the x-axis defines which ports will operate as input ports and which ports will operate as output ports. By way of example, in FIG. 2, beams from the input ports 3, 5 and 7 are transmitted through region 31 of element 29 and beams returned to output port 9 are transmitted through region 33, which is disposed opposite to region 31 in the y-axis.

It will be appreciated that in other embodiments, the location of regions 31 and 33 differ and define devices having different arrangements of input and output ports. Further, as will be described below, in one embodiment, element 29 is reconfigurable to define different positions for regions 31 and 33 for beams between different arrangements of input and output ports.

In one embodiment, element 29 is at least partially formed from a non-birefringent and substantially transparent substrate on which birefringent materials are mounted to define birefringent regions such as regions 31 and 33. In some embodiments, the birefringent materials are able to be moved and mounted or adhered to different locations of the substrate to provide flexibility to reconfigure which ports in device 1 are to operate as input ports and which ports are to operate as output ports. In one particular embodiment, the substrate is formed of glass. In another embodiment, regions 31 and 33 define separate half-wave plate elements, which are able to be positioned at relative positions along the optical z-axis in alignment with the corresponding beam components.

At the output of element 29 in the forward propagation direction, components 25 and 27 have a common vertical orientation. The components 25 and 27 are then passed through a Faraday rotator 35 configured to apply a 45° rotation to each polarization component 25 and 27. Rotator 35 is a non-reciprocal element which applies the same polarization rotation to beams independent of propagation direction through the element. As such, in the reverse direction of propagation, rotator 35 again applies a 45° rotation to each component 25 and 27, as illustrated in FIG. 2. In the illustrated embodiment, at the output of the rotator 35 in the forward direction, each polarization component 25 and 27 has a +45° orientation. In other embodiments, the polarization components 25 and 27 have other orientations, depending on the particular configuration of optical separation and rotation elements.

In many cases the optical isolation that is achieved in this operation can be advantageous though in some cases this will impose a limitation. If a single polarization is imposed to a beam (either intentionally or because of single polarization operation of any component) then the wavelength switch function will be nonreciprocal (isolating) however if no polarizing element is imposed within the switching train then the overall device function will remain reciprocal. In some embodiments, isolation is established between forward and return path through a spatial offset. An exemplary embodiment utilizing this isolation is described below in relation to FIG. 8. Another embodiment providing improved isolation involves establishing a retro reflection point at the switching matrix. In these embodiments, spatial diversity is able to be used to achieve the enhanced directivity rather than polarization isolation.

After propagation through Faraday rotator 35 in the forward direction, the polarization components are passed through a cylindrical lens 37 having optical power in the y-axis. Lens 37 angularly converges the polarization components together at focal plane 39, which defines a first point of symmetry in device 1 of FIG. 1. Referring again to FIG. 1, the polarization components propagate through device 1 separately and are recombined at the LCOS device 11, which defines a second point of symmetry in device 1. Between plane 39 and LCOS device 11, a symmetric polarization loop is established, as illustrated schematically in FIG. 3.

Figure 3:
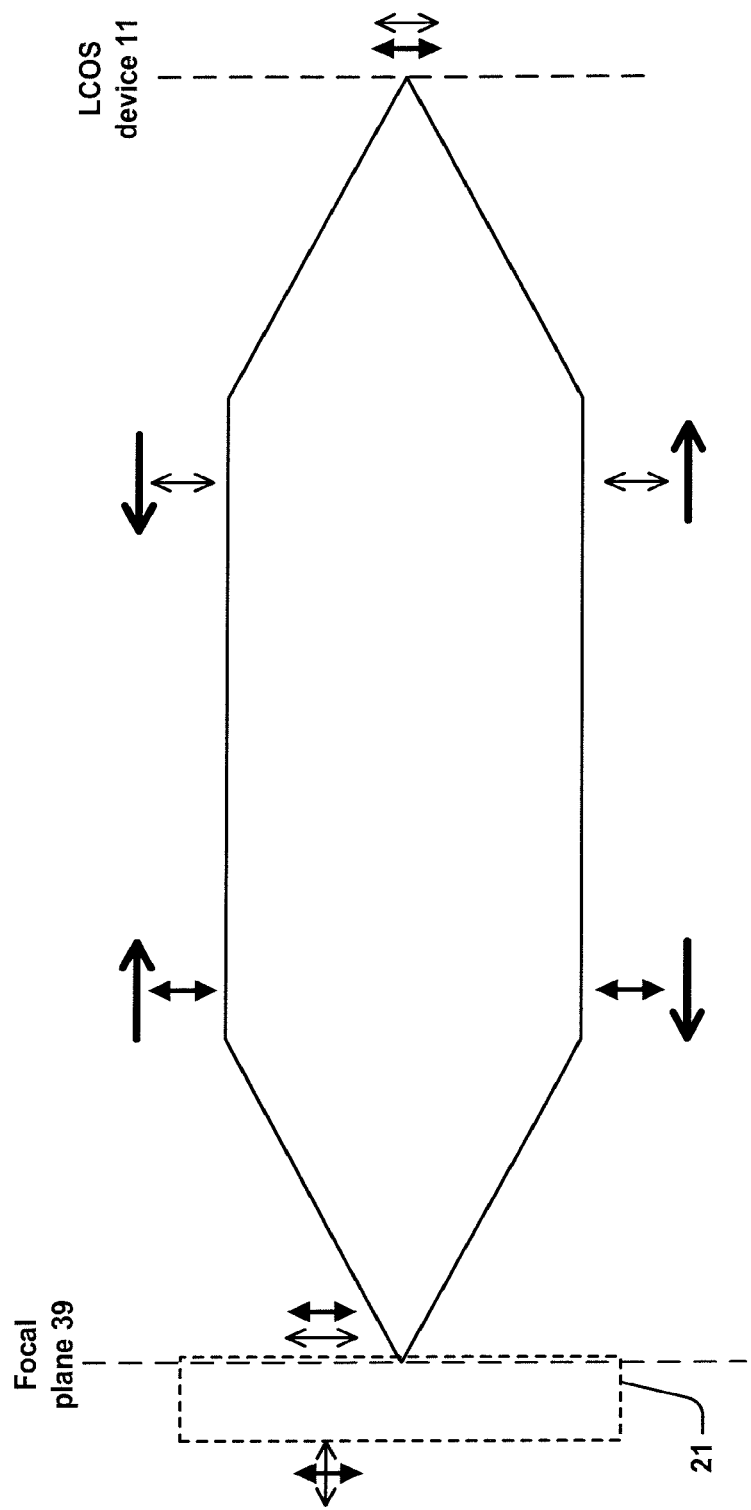
FIG. 3 is a schematic illustration of a symmetric polarization loop established in the WSS of FIG. 1.

Referring to FIG. 3, along the loop, one polarization component propagates clockwise, while the orthogonal component propagates anti-clockwise. Module 21 rotates both polarization components into a common orientation (vertical in the illustrated embodiment) such that polarization dependent effects in the system are equalized. At focal plane 39, these two polarization components are spatially confined, as shown in FIG. 3. At the LCOS device 11, both components are again confined so that they can be simultaneously manipulated by common cells of device 11. In other embodiments, the polarization components are rotated into orientations other than vertical. As the LCOS device is polarization dependent, the polarization components are preferably rotated into alignment with the polarization axis of the LCOS device. In other embodiments utilizing spatial light modulators other than LCOS devices, this alignment of the polarization components with a predefined axis may not be required.

In other embodiments, module 21 is placed at other locations in the optical system and performs substantially the same function as described above. The general requirement is that the polarization equalization performed by module 21 occurs before the optical beams reach polarization dependent optical elements such grism 13 and LCOS 11 of FIG. 1.

When the polarization components return to port selecting module 21 of FIG. 2, they converge at plane 39 and are collimated in passing back through lens 37. The components return through Faraday rotator 35, half-wave plate element 29 and walk-off element 23 in a similar manner to that described in relation to the forward direction. Walk-off element 23 either recombines the components for coupling to output port 9 or couples them out of alignment with the ports to attenuate them. The selection of which beam to couple to the output port is made by the LCOS device, which is selectively driven to apply a predetermined switching angle to the beams in the x-axis. In conventional WSS devices, the establishment of a particular switching state from one input port to an output port simultaneously couples beams between other ports that are symmetric about that switching angle. By way of example, in device 1 illustrated in FIG. 1, switching a beam from input port 3 to output port 9 will simultaneously switch beams from input port 5 to input port 7, potentially giving rise to multipath interference in signals transmitted between ports 5 and 7 and instabilities in laser sources connected to those ports.

Figure 4:
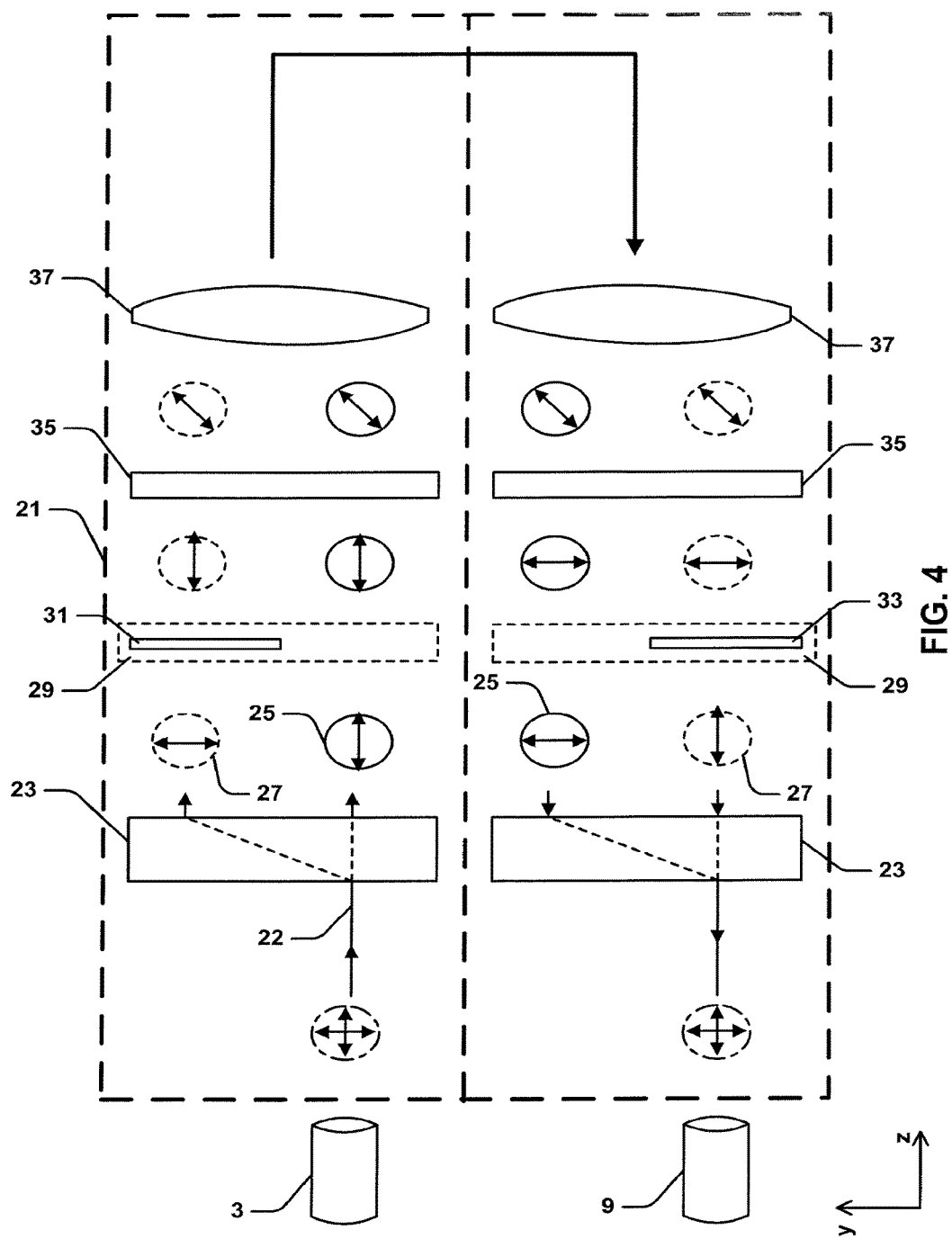
FIG. 4 is a schematic plan view of the selecting module of FIG. 2 showing the trajectory and polarization states of an optical beam passing through the module between an input port and an output port.

The particular configuration of elements in port selecting module 21 acts to reduce or minimize this undesired cross coupling between input ports through a selective process of coupling polarization states. This process will now be described with reference to FIGS. 4 and 5, which illustrate schematic plan views of port selecting module 21 of FIG. 2. Referring initially to FIG. 4, there is illustrated a schematic plan view of port selecting module 21 illustrating the spatial evolution of beams propagating between input port 3 and output port 9. As in FIG. 2, first polarization component 25 is indicated by solid circles and the orthogonal component 27 is indicated by dashed circles.

As described above, in the forward direction, input port 3 projects optical beam 22 through walk-off element 23, half-wave plate element 29 and Faraday rotator 35 to spatially separate the two orthogonal polarization components and rotate them into the same orientation. In this forward direction, component 25 remains aligned with input port 3 in the y-axis and component 27 is refracted out of alignment with port 3 by walk-off element 23.

In the return direction, component 27 is axially aligned with output port 9 and component 25 is out of alignment with output port 9. In this return direction, both components pass through rotator 35 and are rotated 45° such that they are both oriented horizontally. Second component 27 is passed through birefringent region 33 to rotate it into a vertical orientation. Component 25 passes through element 29 without a rotation in orientation and reaches walk-off element 23 in a horizontal orientation and offset from output port 9. In traversing walk-off element 23, component 25 experiences walk-off and is refracted towards port 9 due to its alignment with the preferred axis of element 23 ( horizontal in this embodiment). After passing walk-off element 23, component 25 is axially aligned with port 9 in the y-axis. Component 27 is in the vertical orientation and passes directly through walk-off element 23 without refraction, thereby remaining axially aligned with output port 9. Therefore, both components 25 and 27 are recombined and coupled efficiently into output port 9. Similar coupling occurs between ports 5 and 9, and between ports 7 and 9 and the optical loss incurred by each polarization state is substantially equal.

Figure 5:
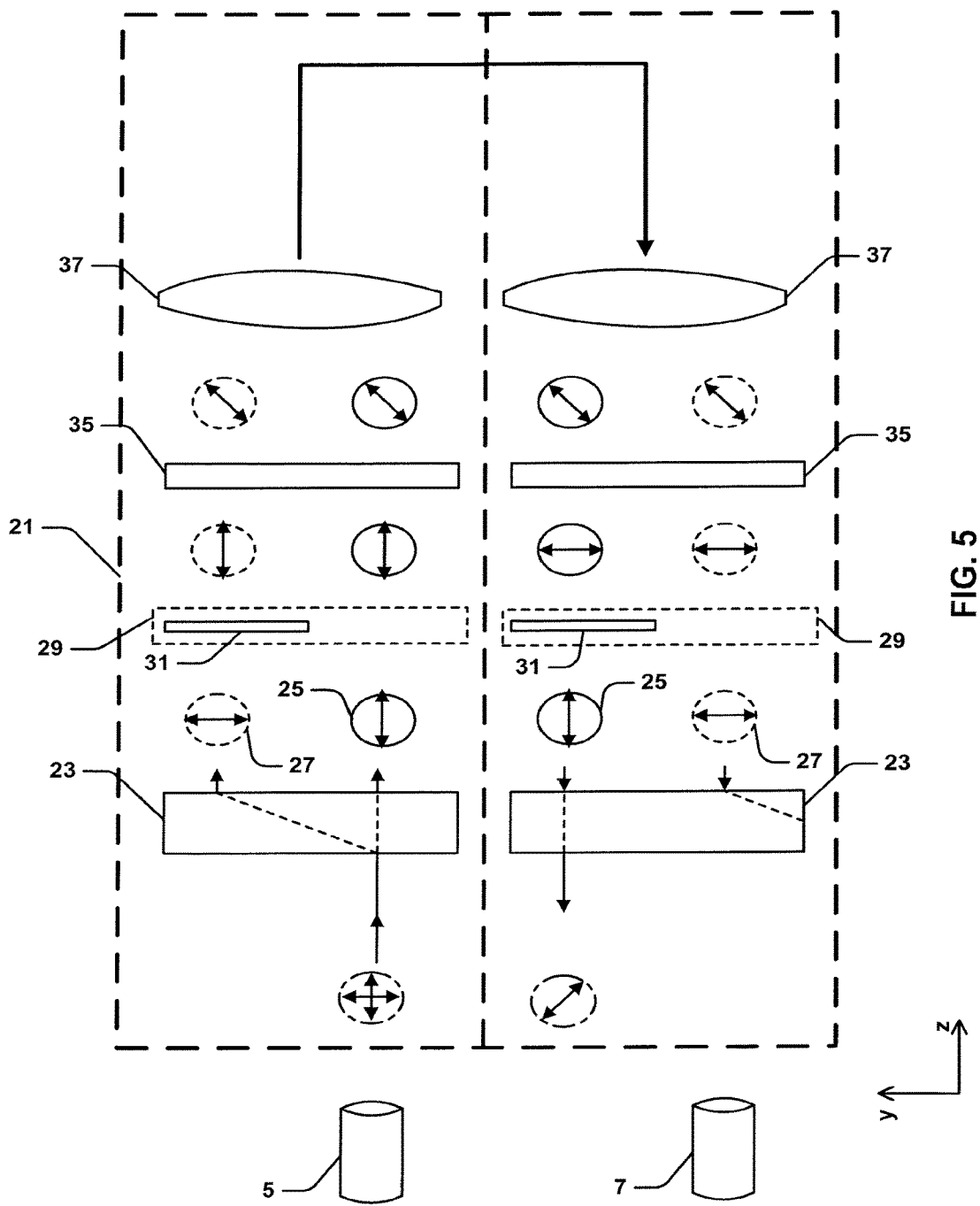
FIG. 5 is a schematic plan view of the selecting module of FIG. 2 showing the trajectory and polarization states of an optical beam passing through the module between two input ports.

Due to symmetry in the optical system, to perform the switching described above, LCOS device 11 also simultaneously sets up a switching path between input ports 5 and 7 of FIG. 2. Referring now to FIG. 5, there is illustrated a schematic plan view of port selecting module 21 illustrating the spatial evolution of beams propagating between input port 5 and input port 7. As with FIGS. 2 and 4, polarization component 25 is indicated by solid circles and the orthogonal component 27 is indicated by dashed circles.

Propagation in the forward direction from port 5 is identical to that described above in relation to FIG. 4. However, in the return direction, the system is asymmetric due to the positioning of region 31 of element 29. Component 25 passes through region 31 of element 29, experiencing a polarization rotation of 90° into a vertical orientation. Component 27 is unaffected by element 29 and remains in a horizontal orientation. In passing through walk-off element 23, component 27 experiences walk-off due to its polarization alignment with the preferred axis of the element. This walk-off refracts component 27 out of alignment with input port 7. Component 25 is not affected by element 23 due to its anti-alignment with the preferred axis of element 23. Component 25 passes directly through element 23 and remains out of alignment with input port 7. Therefore, neither component is coupled to input port 7.

Comparing FIGS. 4 and 5, it can be seen that the symmetry in optical path between input port 3 and output port 9 provides effective coupling of an optical beam between the ports. However, the asymmetry in optical path between input port 5 and input port 7 restricts the optical beam from coupling between the input ports, significantly reducing interference effects to optical signals from the other input ports. The symmetry is controlled by the relative positioning of the half-wave plate regions 31 and 33 such that both separated polarization components undergo the same relative changes in the return direction as in the forward direction. This symmetry is not present between two input ports, only between input ports and output port 9.

As illustrated in the plan views of FIGS. 4 and 5, switching paths that include a half-wave plate element on opposite sides (in the y-axis) between the forward and return directions will provide symmetry and therefore facilitate coupling between an input port and output port. Conversely, switching paths that include a half-wave plate element on the same side (in the y-axis) between the forward and return directions will not provide symmetry and therefore will not couple beams between the fibers. A symmetric path defines a switching path and an asymmetric path defines a non-switching path. From this it can be observed that the choice of a switching path can be made by the relative positioning of half-wave plate elements in the y-axis.

Referring generally to FIGS. 2 to 5, it will be appreciated that the orientations of the particular polarization components described above are exemplary only. In other embodiments, module 21 is configured to manipulate polarization components having different orientations while performing the same functionality. Specifically, walk-off element 23 is configured to split optical beams into polarization components other than horizontal and vertical. Similarly, the relative position of regions 31 and 33 of element 29 are able to be interchanged while still performing the same overall polarization manipulation.

In another embodiment (not shown), module 21 includes a half-wave plate located between element 29 and lens 37. This additional half-wave plate is configured to apply a further arbitrary polarization rotation so as to propagate the beams through device 1 in a preferred polarization state. In a further embodiment, element 29 includes an array of half-wave plates that act to apply different rotations to each of the beams so that they can arrive at the Faraday rotator at an equal but arbitrary orientation.

In one embodiment (not shown) module 21 includes an additional polarizing element having a polarizing axis oriented along a preferred axis. In one embodiment this polarizing element is located between elements 35 and 37. The polarizing element acts to filter out optical power that has strayed from the desired orientation so as to improve isolation between polarization states.

Figure 6:
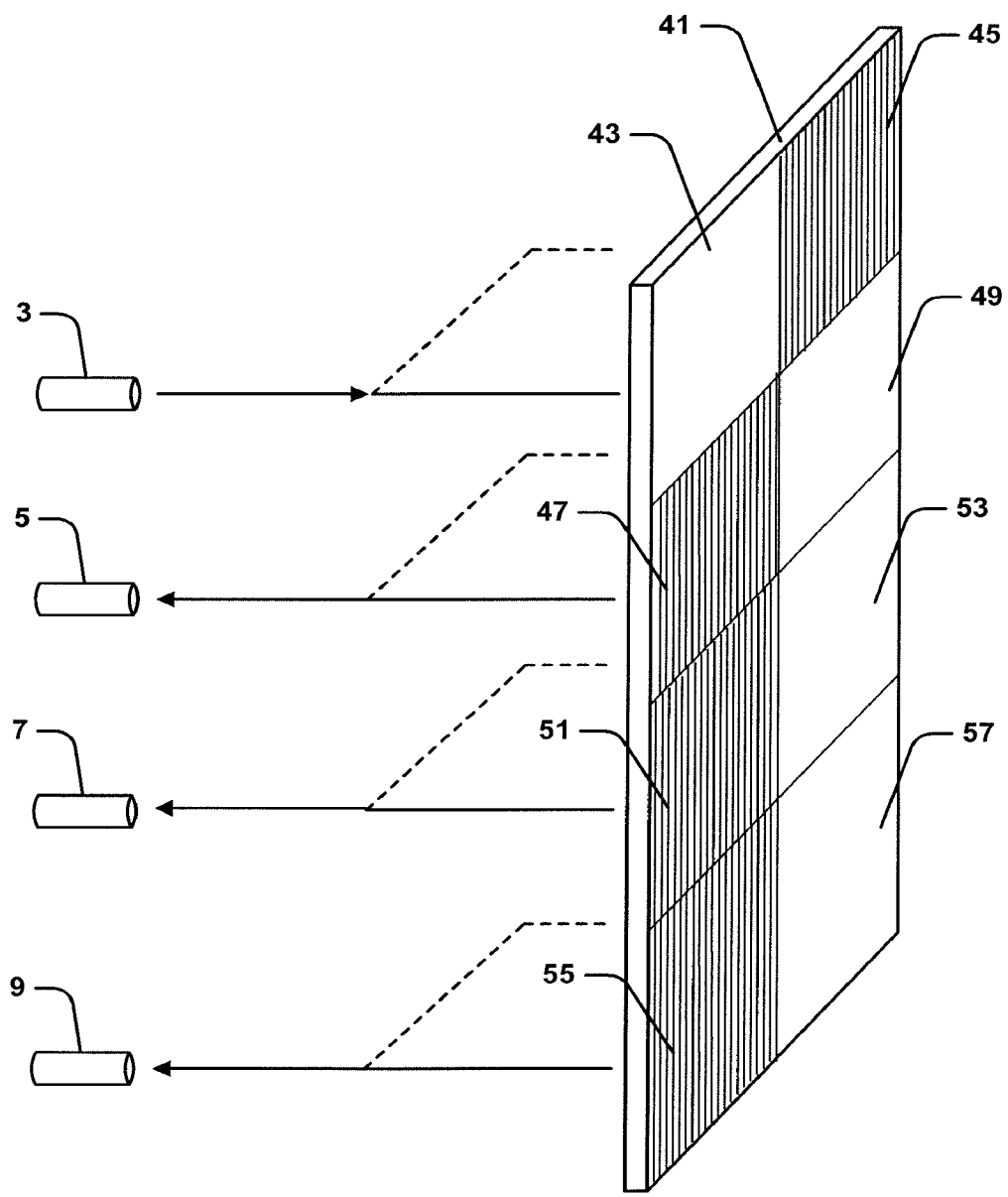
FIG. 6 is a schematic perspective view of a half-wave plate in the form of a reconfigurable transmissive liquid crystal device.

Referring now to FIG. 6, there is illustrated an alternative embodiment half-wave plate element in the form of a reconfigurable transmissive liquid crystal device 41. Device 41 is able to replace element 29 of FIGS. 2, 4 and 5. Like LCOS device 11 of FIG. 1, device 41 includes a two-dimensional array of independently drivable phase manipulating cells configured to impose a relative phase shift to a local area of an incident optical beam. The cells are divided into eight regions 43, 45, 47, 49, 51, 53, 55 and 57 that are axially aligned with polarization components of each beam (walk-off element 23 is omitted from FIG. 6 for simplicity). Within each region, the cells are selectively electrically driven at one of two discrete polarization rotation states. A first state (illustrated by the vertical lines across regions 45, 47, 51 and 55) imposes a relative phase change of 180° or π radians phase shift between constituent sub-components of that particular polarization component to rotate the polarization by 90°. That is, regions driven in the first state operate as a half-wave plate. A second state imposes little or no phase change to essentially pass the polarization component without rotation.

This selective driving in one of two states allows selectively defining of specific ports as being configured as either an input port or an output port. Specifically, defining a symmetric switching path between two ports allows coupling from one port to the other. By way of example, device 41 includes four vertically separated pairs of horizontally adjacent cells. In the top pair of regions, region 45 is driven in the first state and region 43 is driven in a second state. The adjacent three pairs of regions below are driven with an opposite configuration. This sets up symmetric switching paths between port 3 and any one of ports 5, 7 and 9. Therefore, in one configuration, port 3 can be used as an input port and ports 5, 7 and 9 as output ports. Alternatively, ports 5, 7 and 9 can be used as input ports while port 3 is used as an output port.

Figure 7:
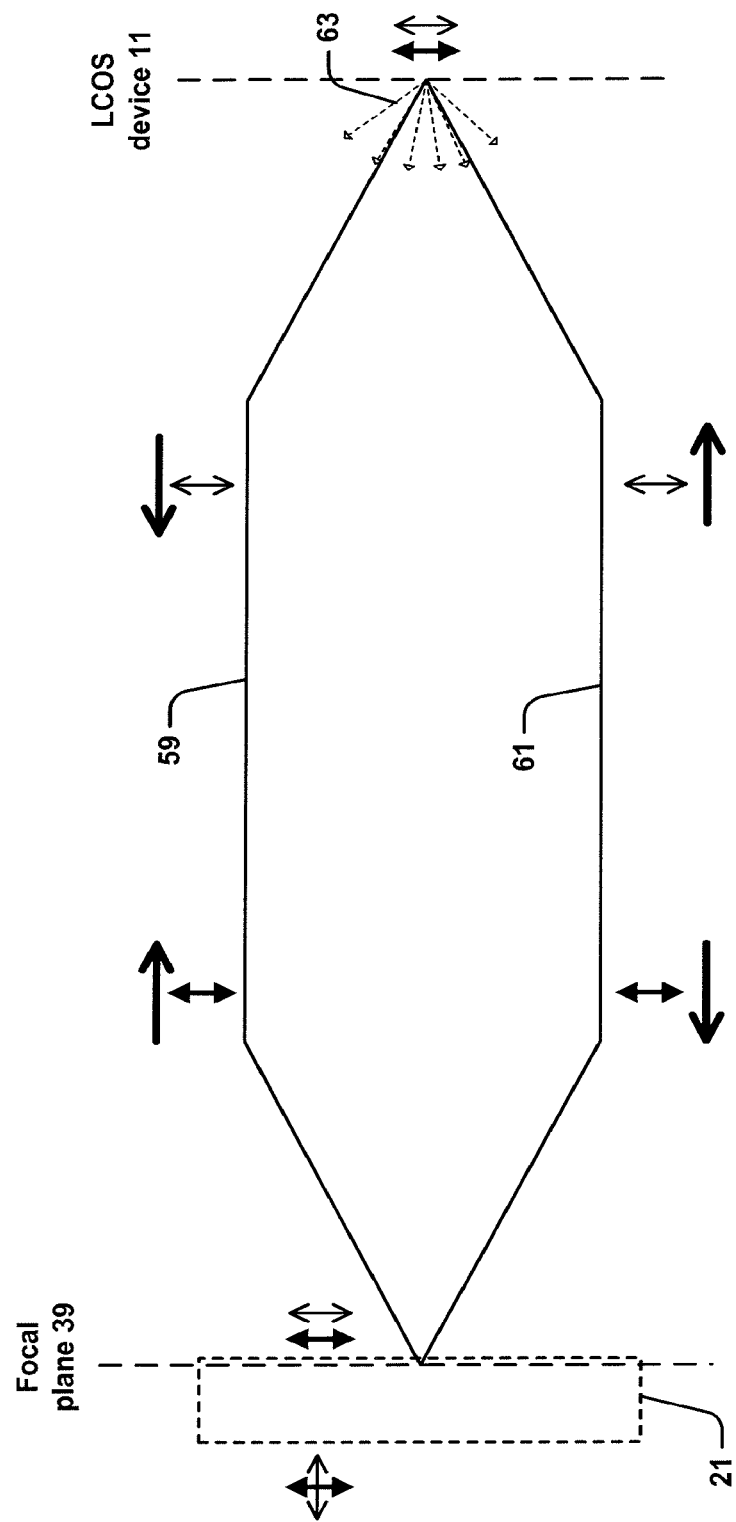
FIG. 7 is a schematic illustration of a symmetric polarization loop established in the WSS of FIG. 1, showing diffractive effects at the LCOS device.

In WSS devices implementing pixilated spatial light modulators, such as LCOS and MEMS (for example, Texas Instruments DLP™) devices, undesired diffraction effects are experienced due to the inherent periodic pattern of the cell structure. The periodicity of the LCOS surface results in a small amount of uncontrolled diffraction in addition to the steering applied to each beam. Referring now to FIG. 7, the symmetric loop path of FIG. 3 is shown with the addition of extra diffraction effects originating from LCOS device 11, illustrated as dashed arrows at the LCOS device. While most of the light is directed along the steering paths 59 and 61, some light is diffracted along other paths, e.g. path 63. If one of these paths is aligned with the input path, then a particular polarization component will be coupled back to the originating input port, resulting in undesired interference effects which degrade the overall device performance.

Figure 8:
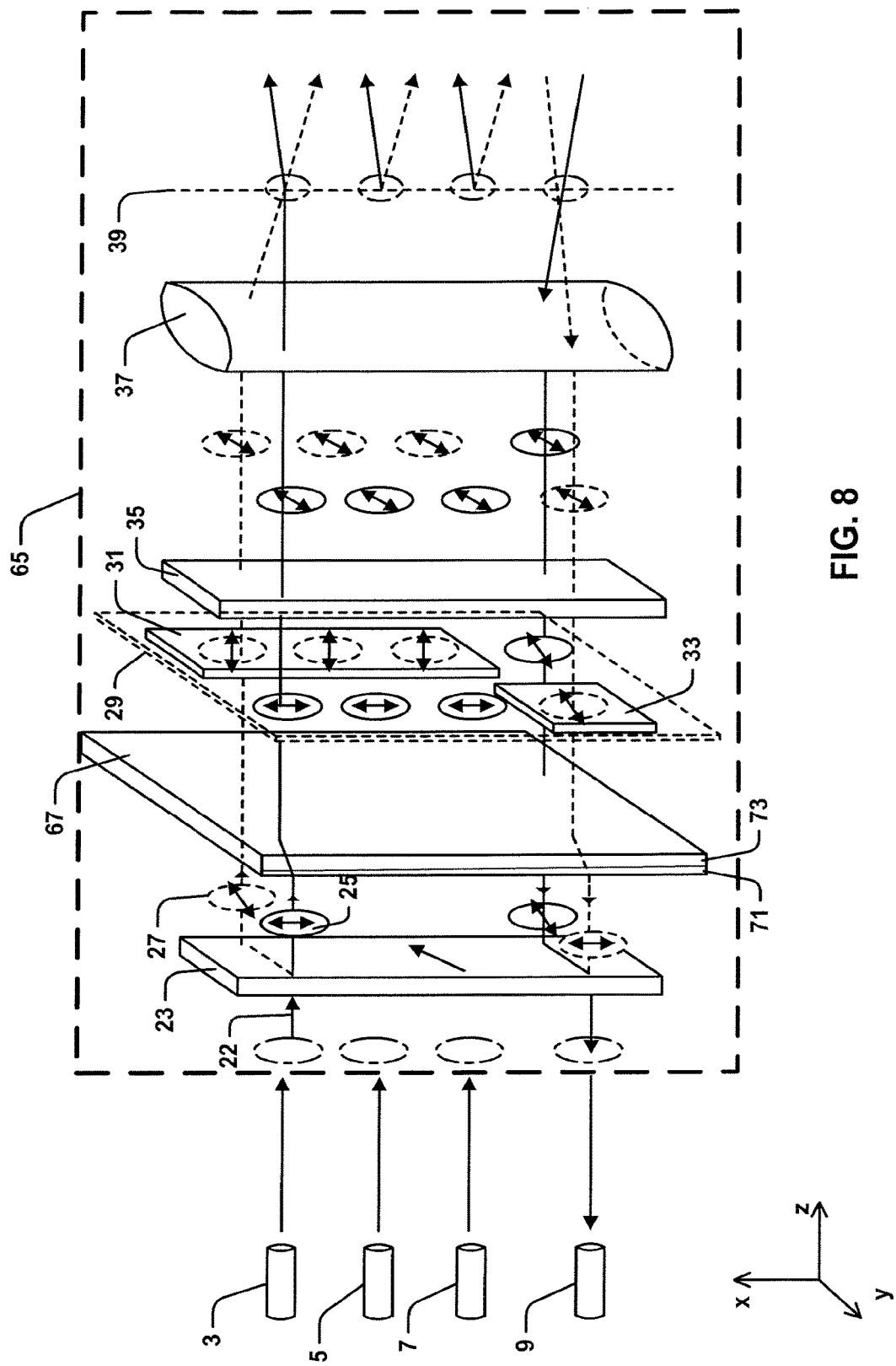
FIG. 8 is a schematic exploded perspective view of a port selecting module for an optical switch according to a second embodiment, showing polarization states of optical beams throughout the module.

Standard polarization diversity schemes do not compensate for these diffractive coupling effects. Referring now to FIG. 8, there is illustrated another embodiment port selecting module 65 which is capable of compensating for the above described diffractive coupling effects. Corresponding features of module 21 are designated by the same reference numerals in module 65. Module 65 includes a beam shifting element 67 located between walk-off crystal 23 and half-wave plate element 29. Module 65 is comprised of a pair of birefringent wedges, configured to shift one polarization component with respect to the other in the x-axis. This shift can be seen more clearly in FIG. 9.

Figure 9:
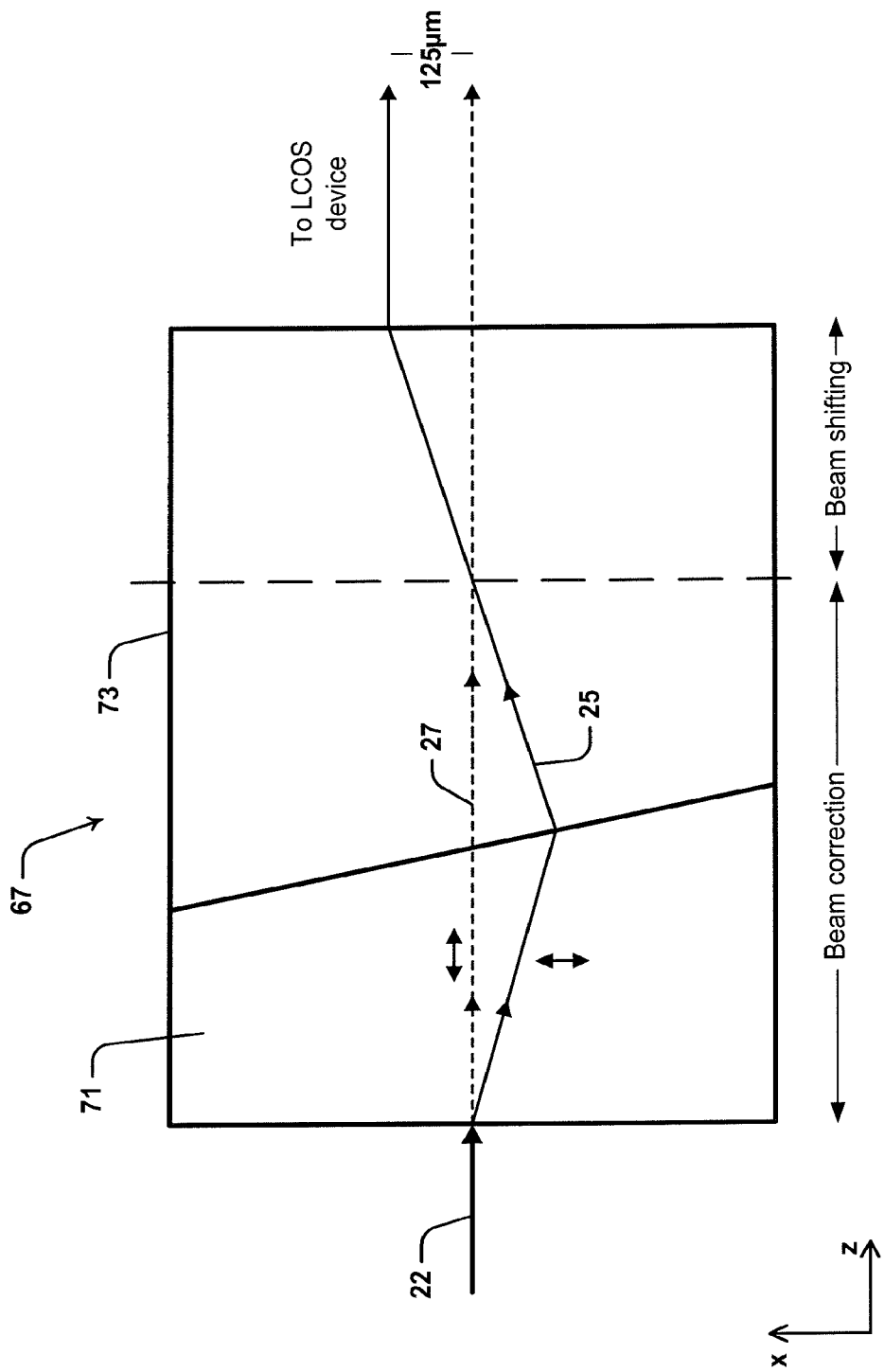
FIG. 9 is a plan view of a beam shifting element used in the port selecting module of FIG. 8, illustrating beam components in the input direction.

Turning to FIG. 9, there is illustrated a plan view of beam shifting element 67 showing propagation of optical beam 22 therethrough. Beam 22 is initially incident onto birefringent wedge 71, which has a crystalline optic axis oriented such that it refracts or 'walks off' component 25 (having a vertical polarization orientation) downward in the x-axis. Birefringent wedge 71 is configured such that component 27 (having a horizontal polarization orientation) passes without any change. The components then propagate through a second birefringent wedge 73, which has a crystalline optic axis oriented orthogonal to that of wedge 71. In propagating through wedge 73, component 25 is walked off upward in the x-axis. The width of wedge 73 is greater than that of wedge 71 and so component 25 experiences a net refraction upward from its original trajectory in the x-axis. Through wedge 73, component 27 again remains unrefracted. The choice of wedge angle here is appropriate to compensate for $1^{st}$ order effects of the polarization dependent switching displacement and may be chosen to optimize any optical design involving polarization diversity and multiple ports.

In effect, element 67 acts to both shift the beams to apply a 125 µm (or other) beam displacement, and also to apply correction to beams that are offset from the desired propagation path. As shown in FIG. 9, the beam shifting function is performed by the right had side of wedge 73 and the beam correction is performed by the combination of the left hand side of wedge 73 and wedge 71. In the beam correction section of the element 67, wedges 71 and 73 have different thicknesses as a function of 'x' position. This means that polarization components that travel at different heights 'x' in device 1 will exit the beam correction section with a small 'x' offset. This subtle variation in the offset as a function of 'x' compensates for system aberrations, and substantially reduces the overall polarization dependent loss in device 1.

It will be appreciated that, in other embodiments, different methods of shifting one polarization component with respect to the other. In one exemplary embodiment, element 67 consists only of the right hand beam shifting side of wedge 73. In another exemplary embodiment, element 67 includes a beam compensator that refracts one polarization state at an angle such that, at the output, it is displaced by about 125 µm from the other polarization component.

At the output of element 67, the two components propagate parallel but with a 125 µm separation in the x-axis, which is half the spacing of the input and output ports. Referring again to FIGS. 7 and 8, the system is symmetric such that components that propagate along the steering paths 59 and 61 are recombined by element 67 and coupled to the corresponding output port. That is, component 25, which was shifted by element 67 in the forward direction, is shifted back to its original position in the x-axis in the reverse direction. Consequently, components 25 and 27 trace the same paths back through element 67 on the return path and are coupled to an output port.

Figure 10:
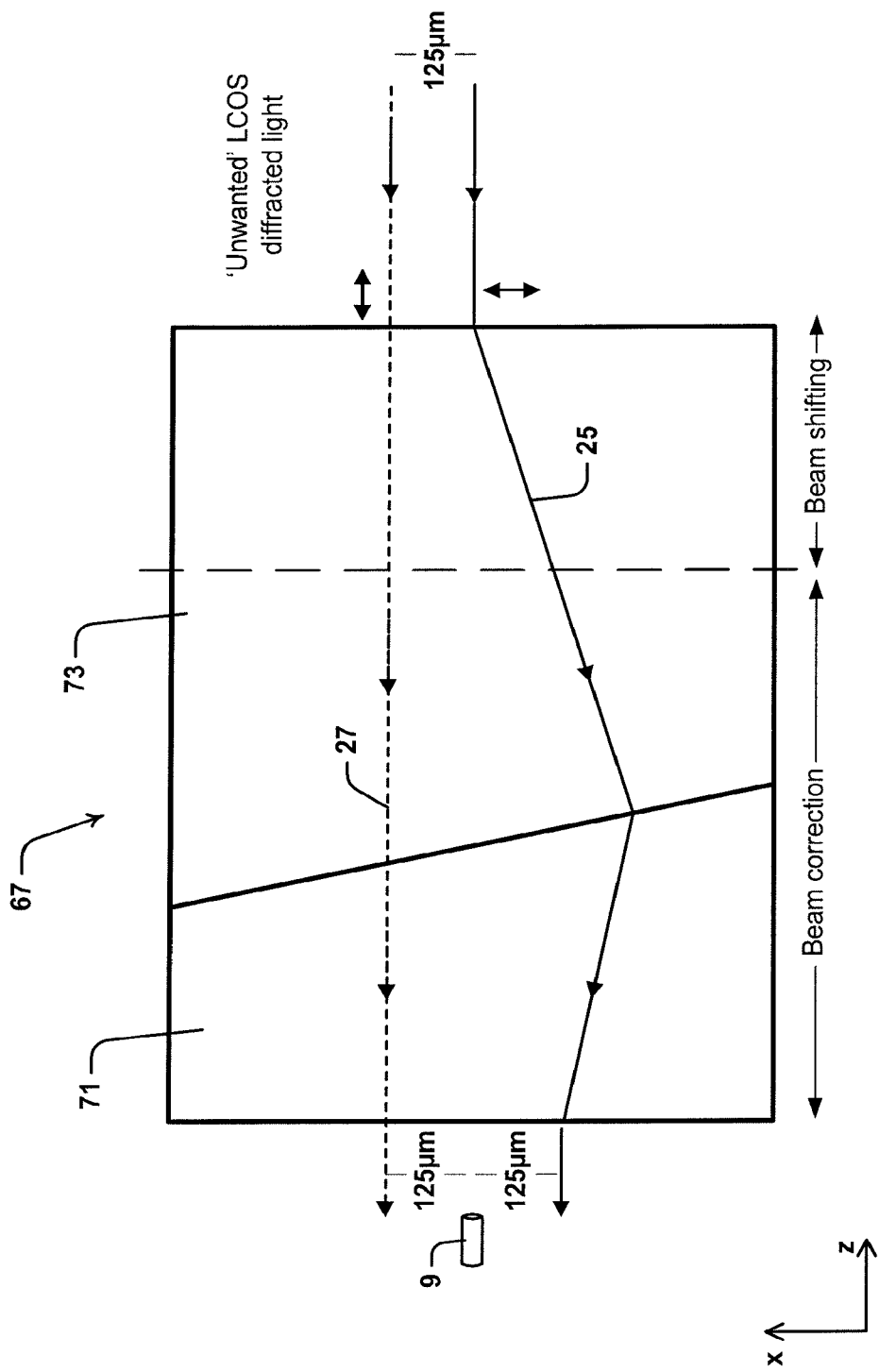
FIG. 10 is a plan view of a beam shifting element used in the port selecting module of FIG. 8, illustrating 'wanted' beam components in the return direction.
Figure 11:
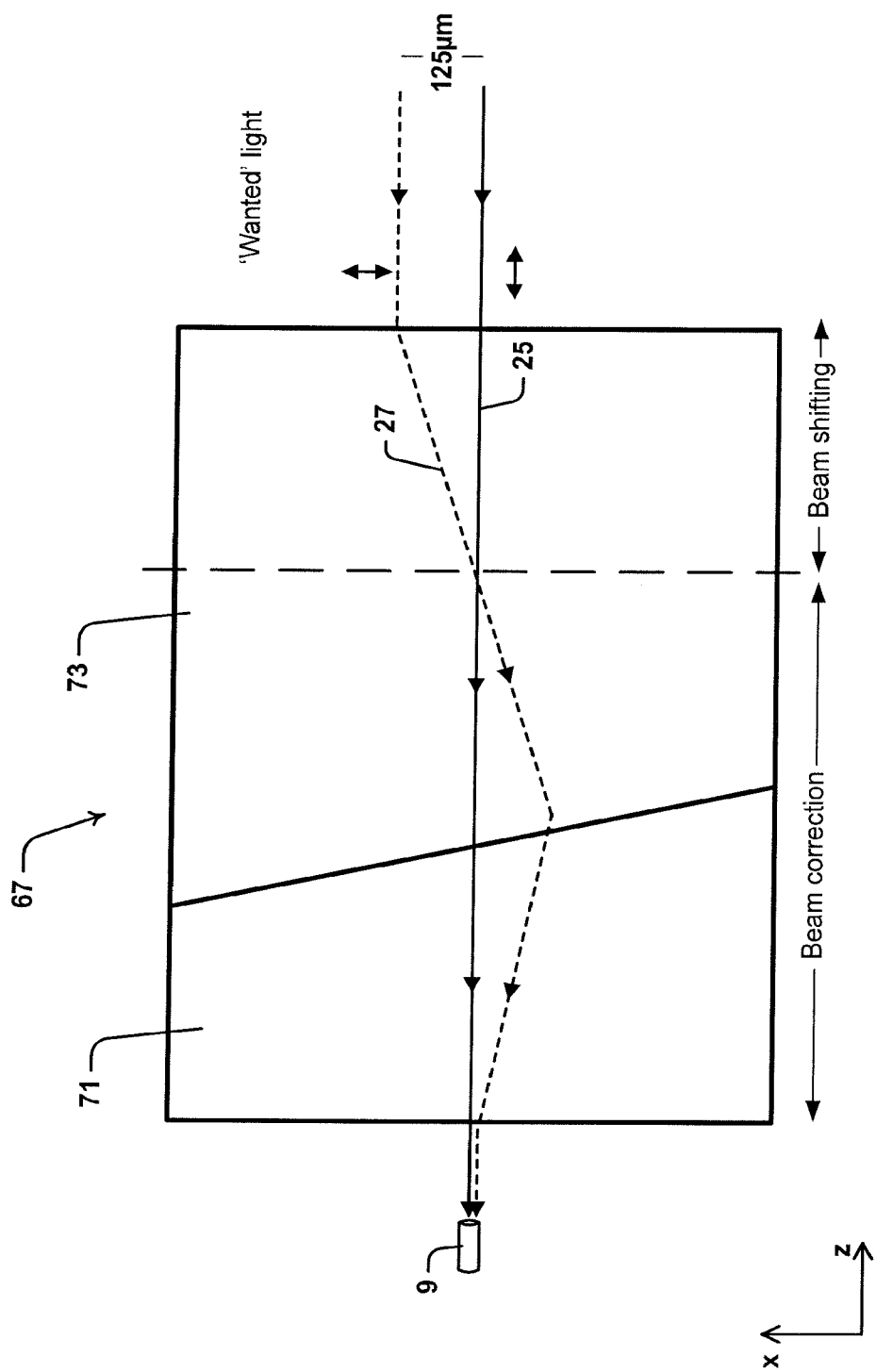
FIG. 11 is a plan view of a beam shifting element used in the port selecting module of FIG. 8, illustrating 'unwanted' beam components in the return direction.

Conversely, components that are diffracted by the LCOS device and coupled back along the input path will not be coupled to an output port. These components propagate back through module 65 where Faraday rotator 35 and half-wave plate element 29 rotate the polarization components into the orthogonal orientation to that of the forward direction. Then, upon reaching beam shifting element 67, the component not shifted in the forward direction (component 27 in the illustrated embodiment) is shifted in the return direction. Similarly, the component shifted in the forward direction (component 25 in the illustrated embodiment) is not shifted in the return direction. This situation is illustrated in FIG. 10, which illustrates a plan view of beam shifting element 67 showing propagation of 'unwanted' components of beams 25 and 27 in the return direction to exemplary output port 9. Here, the position of each component 25 and 27 is reversed from that of FIG. 9. This situation results in both components being shifted and offset by 125 µm out of alignment with output port 9, thereby restricting the components from coupling back to port 9. The situation of 'wanted light' is illustrated in FIG. 11 wherein the components of beams 25 and 27 that are coupled correctly and symmetrically are returned in axial alignment with output port 9.

Therefore, port selecting module 65 restricts back coupling of optical beams from LCOS device 11, thereby reducing interference effects and improving device performance.

The particular shift spacing of 125 µm is chosen as the input and output fibers are disposed in an array having a fiber spacing of 250 µm. Therefore, a shift of 125 µm centres the beams directly between two adjacent ports to minimise cross-coupling between the ports. In other embodiments utilizing different fiber port spacings, element 65 is configured to provide different shifts in the x-axis to accommodate the different spacing of the ports. In further embodiments element 67 is replaced with a walk-off crystal which provides an equivalent 125 µm offset in the x-axis.

Therefore, the above embodiments provide efficient switching of optical beams in a WSS device independent of polarization. Beams being switched between an input port and an output port are coupled efficiently while inadvertent switching of beams between two input ports is significantly reduced.

Dual Source Architecture

As mentioned above, WSS devices can also be configured to operate as dual source devices wherein two groups of optical beams are independently coupled between two sources sharing a common optical system. In known dual source WSS devices, beams from each source are typically separated in angle and/or space in propagation through the device to differentiate the two sources. The angular separation can give rise to aberrations due to angular incidence onto the diffractive grism and LCOS device. The spatial separation requires a larger optical setup with larger components, leading to increased cost.

Figure 12:
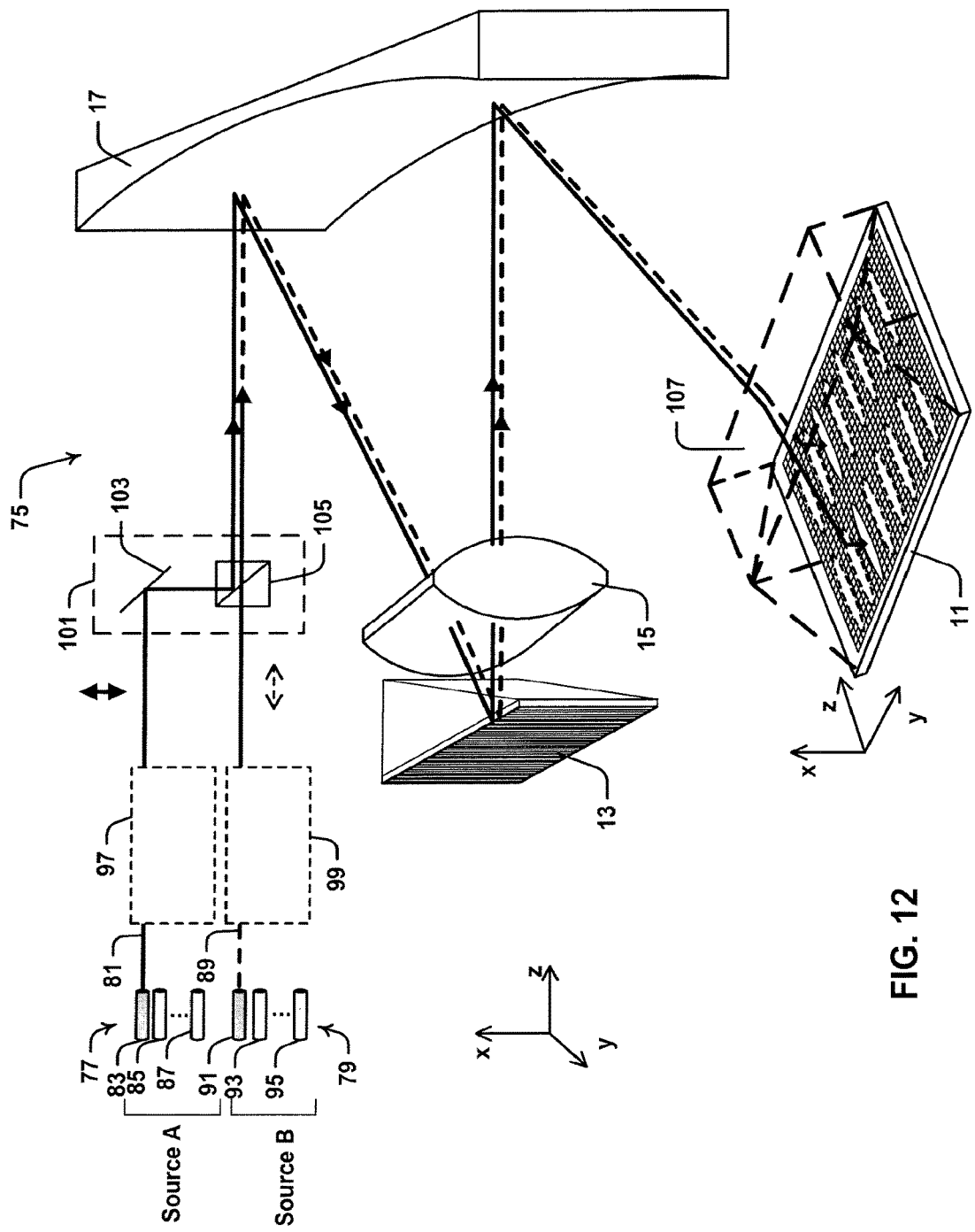
FIG. 12 is a schematic perspective view of a WSS device according to a second embodiment.

Referring now to FIG. 12 there is illustrated a further embodiment WSS device 75 configured to operate as a dual source device. Device 75 is constructed to reduce these spatial and angular separation requirements that are present in conventional dual source WSS devices. Corresponding features of earlier described embodiments are indicated by the same reference numerals.

Device 75 includes a plurality of ports, which are divided into a first group 77 for carrying a first group of beams corresponding to a first optical device (Source A) and a second group of ports 79 for carrying a second group of beams corresponding to a second optical device (Source B). Source A is configured to switch an optical beam 81 from input port 83 to one or more of a first set of twenty three output ports 85 and 87 (only two are shown for simplicity). Simultaneously and independently, Source B is configured to switch an optical beam 89 from input port 91 to one or more of a second set of twenty three output ports 93 and 95 (again, only two are shown for simplicity). In other embodiments, different numbers of output ports are included in each device.

The two groups of ports 77 and 79 are disposed parallel to each other and transmit beams through corresponding independent polarizing port selecting modules 97 and 99. In addition to providing appropriate polarization manipulation, modules 97 and 99 are configured to output beams 81 and 89 in orthogonal polarization states. In the illustrated embodiment, module 97 outputs a beam with vertical polarization and module 99 outputs a beam with horizontal polarization. In one embodiment, modules 97 and 99 comprise port selecting module 21 of FIG. 2, with one module including elements oriented to provide vertical beam output and the other module including elements oriented to provide horizontal beam output. In some embodiments, modules 97 and 99 include port selecting module 21 of FIG. 2 in addition to other optics. In one embodiment, modules 97 and 99 include only polarizers oriented with their axes aligned to output the required polarization orientation. In further embodiments, other known polarization diversity systems are implemented in place of, or in addition to modules 97 and 99.

Referring still to FIG. 12, beams 81 and 89 are passed through a beam confining module 101 for spatially confining and realigning beams 81 and 89 along a direction of propagation (z-axis). This spatial confinement reduces the necessary size of the optical system and associated coupling elements, and allows for more efficient use of space on LCOS device 11. At the same time, the beams are restricted from being spatially overlapped so as to maintain isolation between the signals from the two sources. In one embodiment, beams 81 and 89 are confined to a spatial offset of about 300 µm in the y-axis (wavelength dispersion axis). In other embodiments, the offsets are chosen by the beam size in the system, and the required optical isolation between sources A and B.

Figure 13:
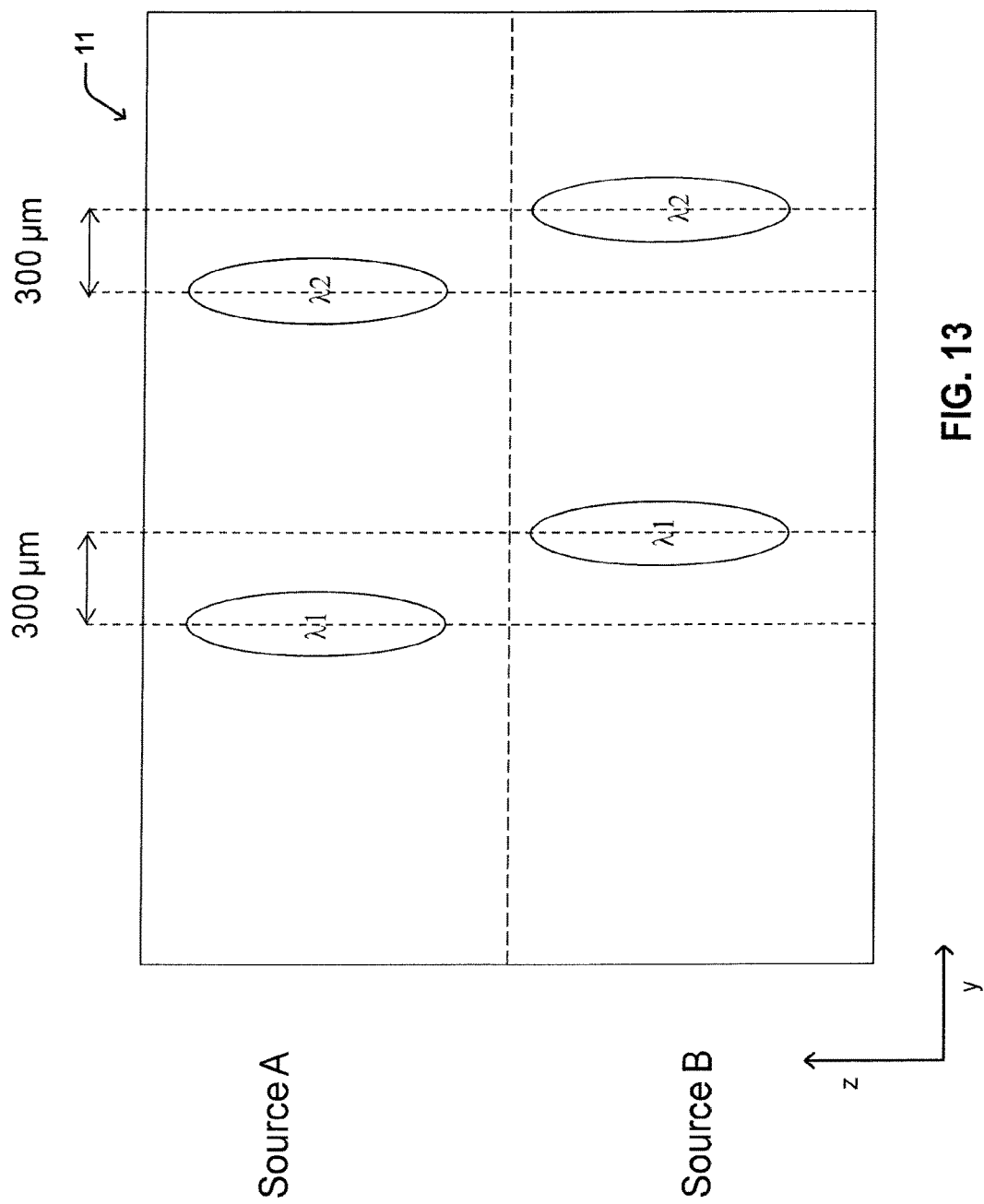
FIG. 13 is a sectional front view of an LCOS device showing the relative positioning of wavelength channels between two input sources.

The spatial offset defined by module 101 emerges as an offset of individual wavelength channels at LCOS device 11. Referring now to FIG. 13, there is illustrated schematically front view of a region of LCOS device 11. As shown, the offset of 300 µm defined by confining module 101 provides a 300 µm offset between corresponding wavelength channels of sources A and B in the y-axis. This offset provides enhanced isolation between signals from sources A and B.

Returning to FIG. 12, confining module 101 includes an angled mirror 103, which reflects beam 81 and directs it perpendicularly towards beam 89. Both beams are passed through a polarization beam splitter (PBS) 105 that is configured to reflect beam 81. Beam 89, having an orthogonal polarization orientation, is not affected by the reflective surface and passes directly through PBS 105. At the output of module 101, beams 81 and 89 propagate parallel with a predefined spacing.

It will be appreciated that fiber arrays 77 and 79 corresponding to sources A and B need not be disposed parallel to each other. By suitable angling of mirror 103, the two sources are able to be angled with respect to each other. In one exemplary embodiment, fiber array 77 from Source A is disposed perpendicularly to fiber array 79 of Source B. This arrangement of fibers provides simplicity for aligning the beams and enhanced isolation between the two arrays of fibers. In further embodiments, fiber arrays 77 and 79 are disposed at angles other than 90° to each other.

Figure 14:
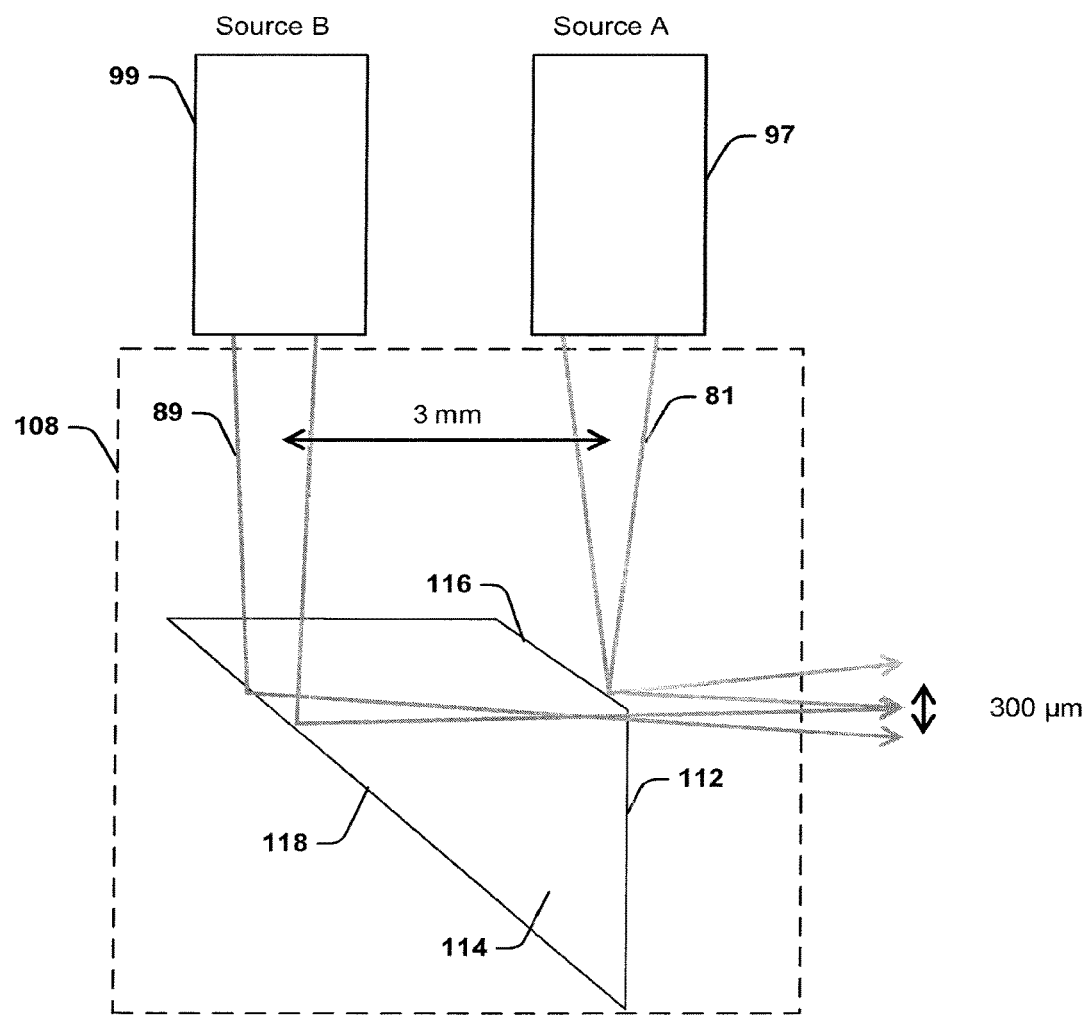
FIG. 14 is a schematic plan view of a beam confining module according to an embodiment.

Referring now to FIG. 14, there is illustrated a second embodiment beam confining module 108. Module 108 includes a coupling prism 114.

To confine the beams from the two sources, beam 81 from Source A is directed onto a first reflective surface 116 of prism 114 which reflects beam 81 at an angle substantially 90° from the input direction. Beam 89 from Source B is directed onto a second reflective surface 118 of prism 114 and is also reflected at an angle substantially 90° to the input direction. Reflective surfaces 116 and 118 are disposed substantially parallel with each other but are spatially separated. The reflection of beam 81 occurs at a longitudinally separate location from that of beam 89 and, upon reflection, this separation translates to a controlled transverse separation.

The focal point from focusing lens 37 of module 97 is located at surface 116 and the focal point from lens 37 of module 99 is located on transmissive surface 112. In other embodiments, the respective focal points are located elsewhere. In the illustrated embodiment, the separation between the beams after module 108 is about 300 μm. However, the exact separation will be determined by the size of the focal spots at surfaces 116 and 112, and the degree of isolation required between sources A and B Although module 108 outputs confined beams 81 and 89 at a direction 90° to the input direction, it will be appreciated that the beams can be reflected off a further 45° mirror (not shown) to output the beams in the same direction as they were input. This allows module 108 to be incorporated into device 75 of FIG. 12 in place of model 101.

Figure 15:
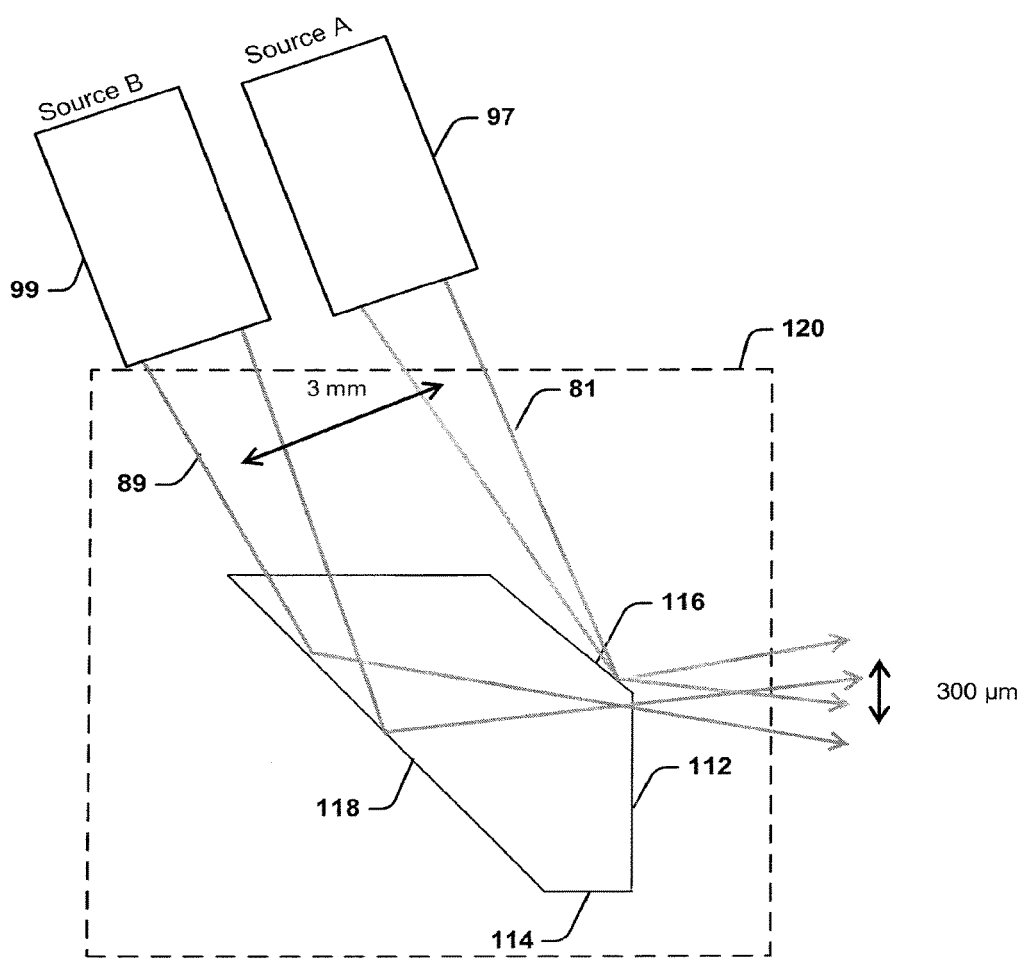
FIG. 15 is a schematic plan view of a beam confining module according to another embodiment.

Referring to FIG. 15, there is illustrated a third embodiment beam confining module 120. Module 120 operates in substantially the same manner as module 108 of FIG. 12 but is positioned to output confined parallel beams 81 and 89 at an angle greater than 90° to the input direction. In various embodiments, beams 81 and 89 from sources A and B are able to be confined to arbitrary spatial offsets and directed at arbitrary angles by varying the orientation and/or distance between surfaces 116 and 118.

Although, beams 81 and 89 are illustrated as having an input spatial separation of 3 mm in FIGS. 14 and 15, it will be appreciated that this spatial separation is exemplary and dependent upon the particular optical system. In other embodiments, beams 81 and 89 are input from sources A and B with different spacings.

The fiber ports, polarizing modules 97 and 99 and beam confining module 101 collectively define a "front end" of WSS device 75. The "back end" is defined by the switching and dispersive optics, including the grism 13 and LCOS device 11. In known dual source WSS systems, beams of separate devices are spatially separated at the front end for separate processing at the back end. This front end separation of beams provides lower limits on the physical size of the source and the optical elements required to manipulate each beam. In device 75, beams 81 and 89 are encoded with perpendicular polarization orientations and transmitted together through the back end of the device.

Referring still to FIG. 12, device 75 includes grism 13 for spatially separating from the beams the plurality of wavelength channels in the y-axis. In various embodiments, grism 13 may be formed of suitable materials to provide a low polarization dependent loss or a reduced polarization sensitivity to further enhance the polarization diversity of device 75. The dispersed wavelength channels are incident onto a separation element 107 for spatially separating the wavelength channels in the x-axis by polarization for incidence onto LCOS device 11. LCOS device 11 includes an array of independently drivable cells for separately and independently processing each of the separated wavelengths from devices A and B. As illustrated, wavelength channels of Source A are processed at a location that is spatially offset in the z-axis to wavelength channels of Source B (a separation in the x-axis translates to a translation in the z-axis upon transmission through separation element 107).

Figure 16:
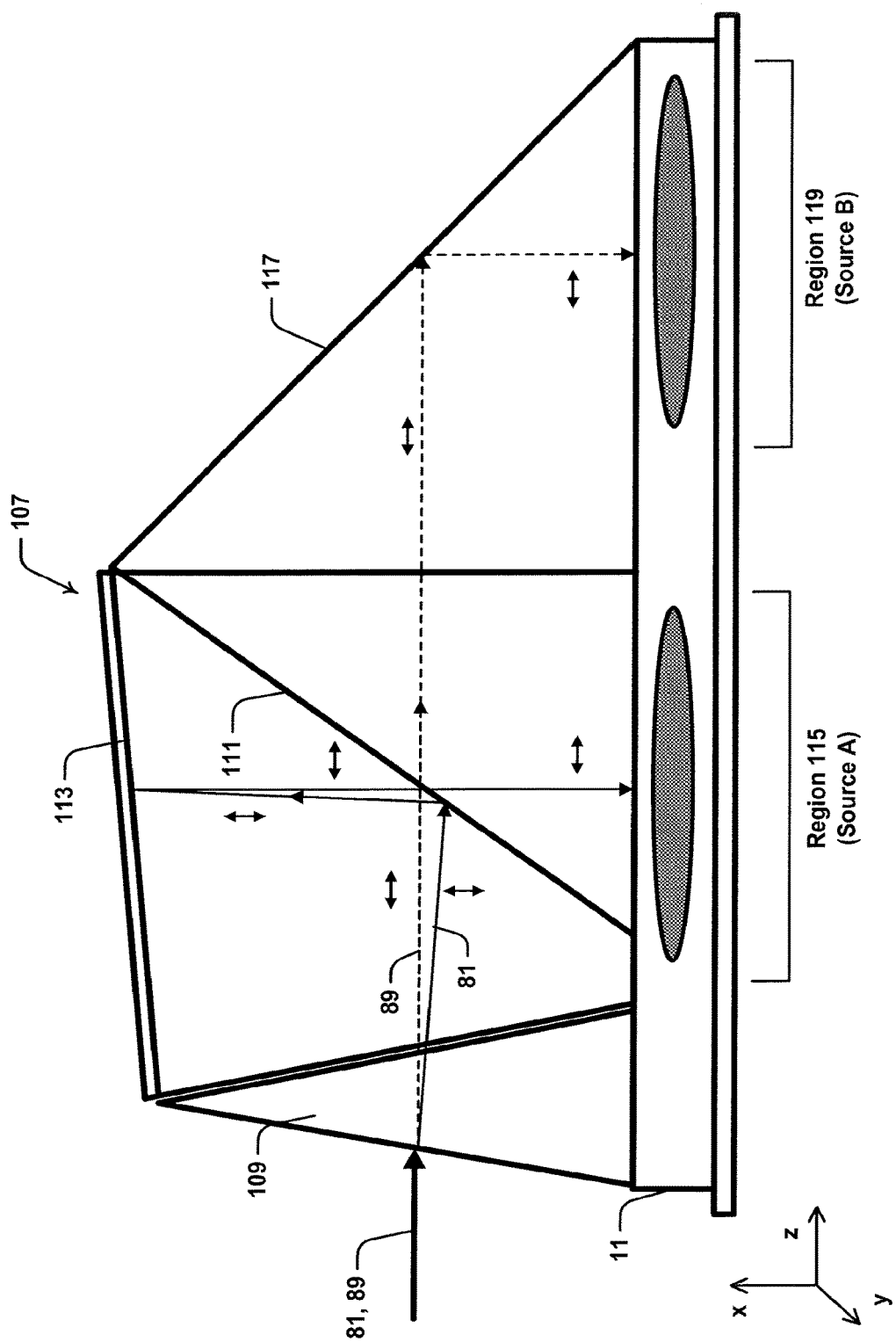
FIG. 16 is a side view of a separation element used in the WSS device of FIG. 12.

Referring now to FIG. 16, there is illustrated a side view of separation element 107, the operation of which will now be described. Confined beams 81 and 89 are together incident onto a side of an optional birefringent wedge 109, which angularly diverges beam 81 from beam 89 with very high polarization extinction. The diverging beams are then passed through a PBS 111, which reflects vertically polarized beam 81 and transmits horizontally polarized beam 89. Beam 81 is reflected vertically onto a half-wave plate element 113, which reflects beam 81 and rotates it into a horizontal polarization. On its downward return, beam 81 passes directly through PBS 111 and is incident substantially perpendicularly onto a first region 115 of LCOS device 11. Beam 89 is transmitted onto an angled mirror element 117, which reflects beam 89 substantially perpendicularly onto a second region 119 of LCOS device 11. The paths traveled by beams 81 and 89 through element 107 are substantially equal.

Separating element 107 is configured to receive the beams propagating in the z-axis and project them downward onto LCOS device 11 in the x-axis. Regions 115 and 119 are offset in the z-axis such that the independently drivable cells of LCOS device 11 simultaneously and independently route optical beams from devices A and B through the common optical system. In other embodiments, separating element 107 does not include wedge 109.

Returning to FIG. 12, the design of device 75 allows the two orthogonal beams from separate devices to be transmitted along spatially confined or overlapping paths and reduces the need for relatively large physical separation of the beams in the device. Therefore, the physical dimensions of device 75 are able to be made smaller than other known dual source WSS devices.

Thermal and Stability Control

Protection from thermal changes and vibrations to the switching devices described above is provided in part by the substrate and enclosure used to support and protect the device. In some embodiments, the device is mounted on a thick 5 mm substrate which provides for increased optical stability against effects such as bending. Further, the device enclosure includes copper shielding and electronically controllable thermoelectric temperature controllers mounted to the substrate. All of these temperature and stability controlling features add to the size of the packaged device, particularly the device height. There is generally a desire to minimize the overall package size of an optical device.

Described below are embodiments that incorporate further protection from beam misalignment due to temperature changes and device stability by utilizing active beam control and correction. Use of active beam correction allows the relaxing of traditional temperature/stability control features in place of the active corrective system, thereby allowing designers to remove one or more controlling features and reducing the overall package size.

Figure 17:
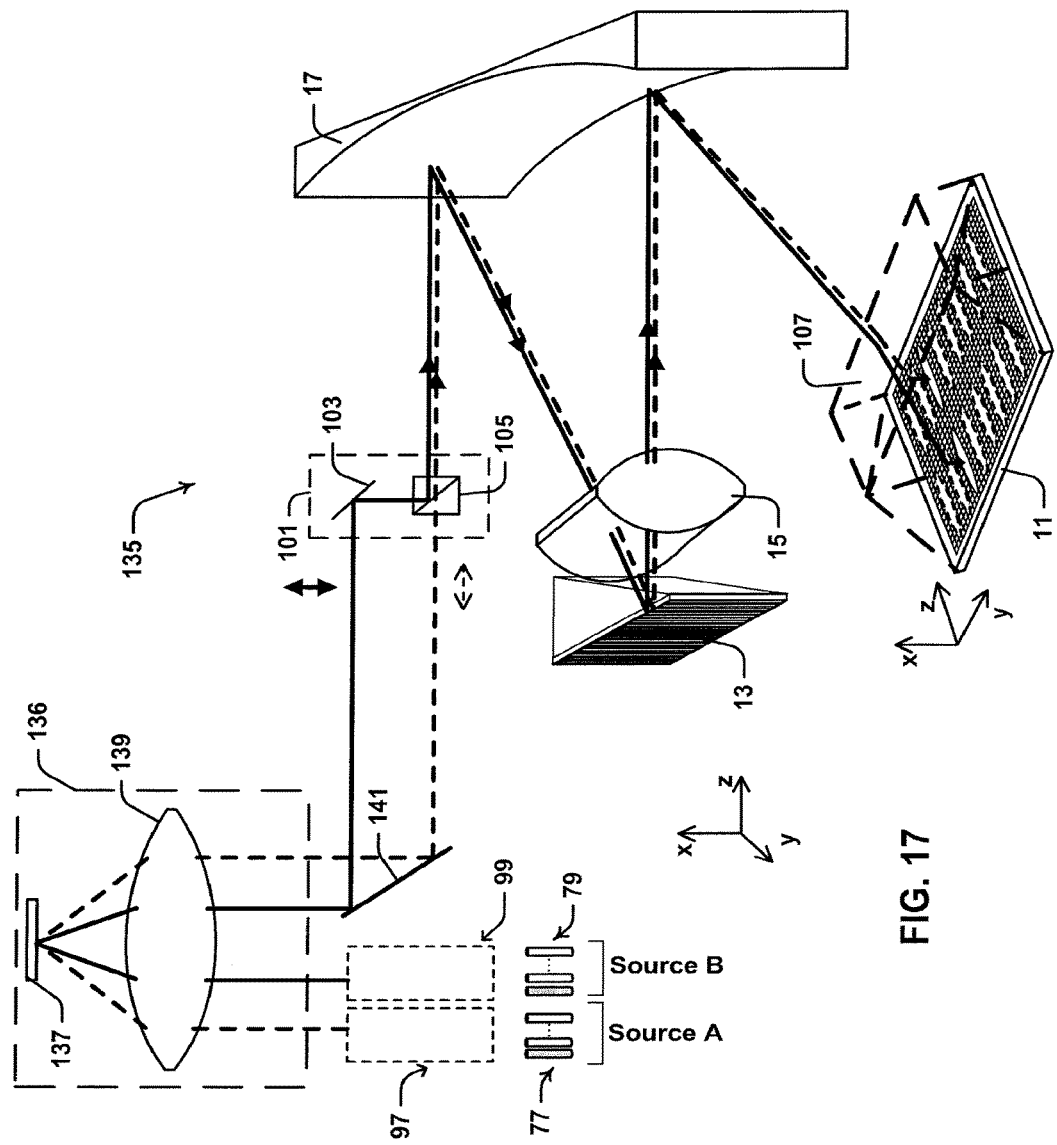
FIG. 17 is a schematic illustration of a WSS device incorporating a beam correction module with electrically controllable MEMS mirror for providing simultaneous active beam control to two independent optical devices.

Referring to FIG. 17, there is illustrated a WSS device 135 incorporating an active beam correction module 136. Module 136 includes an electrically controllable MEMS mirror 137 and a spherical lens 139, and provides simultaneous active beam correction to two independent optical sources (Source A and Source B). Functionally, device 135 is substantially similar to device 75 of FIG. 11 with the addition of active beam control. Corresponding features of earlier described embodiments are indicated by the same reference numerals in FIG. 17.

Figure 18:
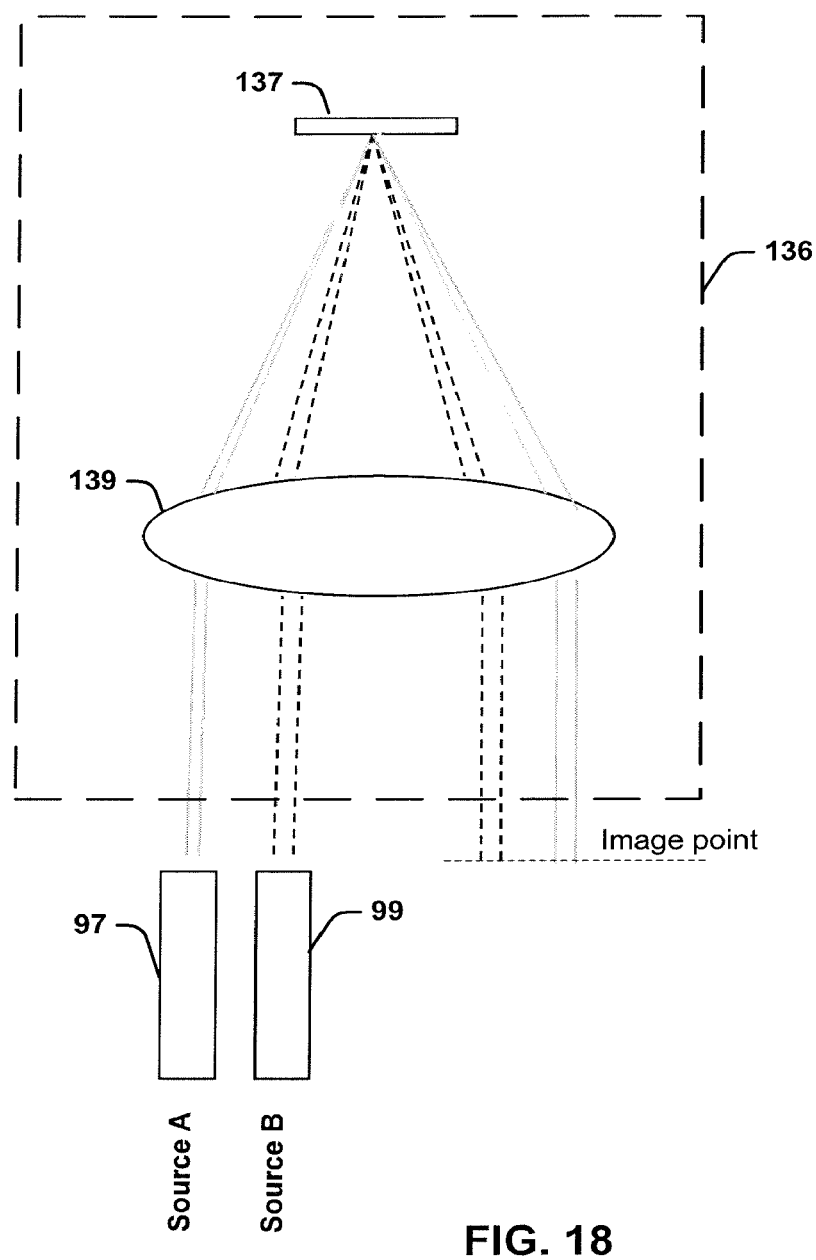
FIG. 18 is schematic plan view of the beam correction module used in the WSS device of FIG. 17.

A schematic plan view of the active control system 136 is illustrated in FIG. 18. MEMs 137 is mounted on one end to a substrate on which device 135 is mounted so as to be disposed vertically and extending perpendicularly from the substrate. Spherical lens 139 is positioned one focal length from both sources A and B on one side and one focal length from MEMs 137 on the other side. Lens 139 simultaneously focuses beams from both sources onto MEMS 137 and collimates the beams returning from MEMS 137 to an image point 140.

Referring again to FIG. 17, in terms of relative positioning, module 136 is located after modules 97 and 99 and before cylindrical module 101. However, it should be understood that, in other embodiments, module 136 is located at other points before module 101 and after sources A and B. In one such embodiment, module 136 is located within modules 97 and 99, after elements 35 and before elements 37.

An angled reflector 141 is positioned to direct beams 90° into the plane of the switching optics, although this element is not strictly necessary and angles other then 90 degrees are able to be used. It will be appreciated by the skilled person that, in other embodiments, different optical configurations of module 136 can be designed to allow a single source or many sources for the same single MEMS 137. In another embodiment, MEMS 137 is replaced with an array of steering elements, each of which is aligned with a separate source.

In operation, MEMS 137 is electronically configurable to be tilted at predetermined angles in one dimension to selectively adjust the beam trajectories and compensate for misalignments in device 135. Misalignment of beams in device 135 is caused by, inter alia, the bending and deformation of optical elements due to temperature change and mechanical instabilities. MEMS 137 is controlled by an electronic control system (not shown). In one embodiment the control system is adapted to receive input from a temperature sensor and, in response to that input, specify a particular tilt angle of MEMS 137. In another embodiment, a reference beam is coupled through one of the sources and received by an external detector to detect an optimum coupling trajectory. The data received by the detector is fed to MEMS 137 to specify a tilt angle to maintain the optimum coupling.

The MEMS is situated such that each optical beam is reflected off the mirror at a predefined angle. The MEMS is controllable to tilt the mirror in one dimension so as to adjust the trajectory of the beams in one dimension. In another embodiment, the MEMS is configured to be tiltable in two dimensions. This selective adjustment allows for correction of beam trajectories that arise from thermal changes to the optical elements in the device.

In device 135, MEMS 137 is mounted vertically onto substrate 123 so as to direct beams propagating across the substrate. In some embodiments, it is advantageous to mount MEMS 137 horizontally onto substrate 123 such that MEMS 137 faces vertically upward. In these embodiments, a slightly different configuration is required, as described below.

Figure 19:
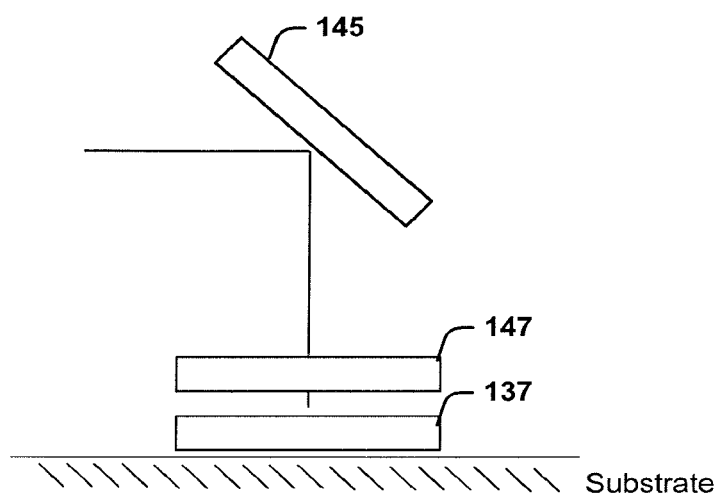
FIG. 19 is a sectional side view of an alternate beam correction module wherein the MEMS mirror is mounted co-planar with the substrate.

Referring now to FIG. 19, there is illustrated a schematic side view of MEMS 137 mounted co-planar with the substrate on which the device is mounted. In this embodiment, a turning mirror 145 is used to direct the beam from its substantially horizontal propagation, vertically downward onto MEMS 137. Before reaching MEMS 137, the beam is passed through a polarization correcting quarter-wave plate 147 for rotating the polarization of the beam to correct for polarization changes induced by turning mirror 145. After propagation through quarter-wave plate 147, the beam is reflected off MEMS 137 at an angle depending on the tilt angle of the device. The reflected beam is passed back through quarter-wave plate 147 and directed off turning mirror 145 back into the switching device. The beam passes through this system initially prior to switching and again after switching has been performed.

Figure 20:
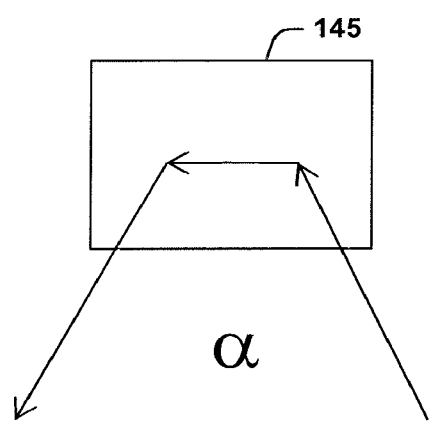
FIG. 20 is a plan view of a turning mirror used in an embodiment of the beam correction module.

A plan view of turning mirror 145 is illustrated in FIG. 20. Optical beams are reflected off mirror 145 twice: once prior to incidence onto MEMS 137 and once after reflection off MEMS 137. Each reflection off mirror 145 rotates the polarization of the beams by an angle θ, which is dependent upon the incident angle α to mirror 145. Quarter-wave plate 147 corrects for these polarization rotations to ensure the beam output from correcting module 136 of FIG. 17 has substantially the same polarization orientation as the input beam.

Figure 21:
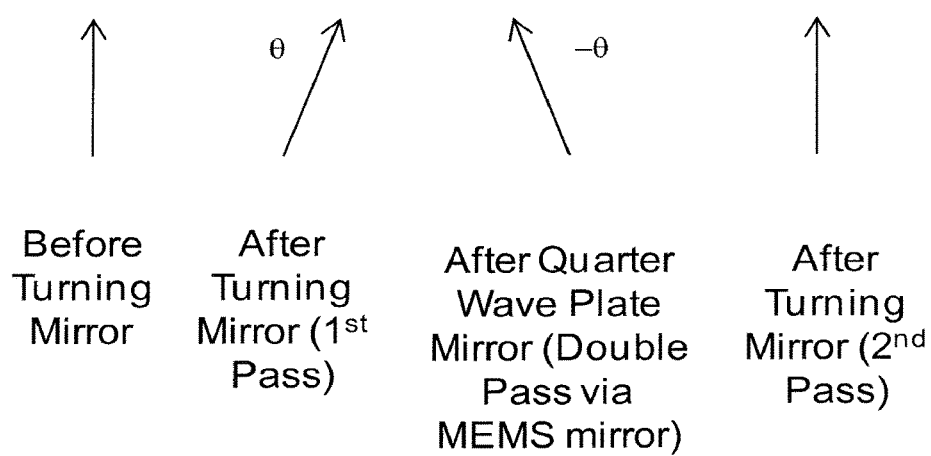
FIG. 21 is a schematic illustration of the evolution of the polarization state of the beam through a turning mirror and a quarter-wave plate.

Referring to FIG. 21, there is illustrated a schematic illustration of the evolution of the polarization state of the beam through turning mirror 145 and quarter-wave plate 147. In operation, turning mirror 145 rotates the polarization of the beam by an angle θ in one direction depending on the angle of incidence (α) of the beam onto mirror 145. After two passes through quarter-wave plate 147, the direction of the rotation of polarization is flipped to −θ. Finally, upon the second pass of turning mirror 145, the beam undergoes a further polarization rotation that undoes the initial polarization rotation.

The operation of the polarization correction is most efficient when the optical axis of quarter-wave plate 147 is parallel or perpendicular to the polarization state of the optical beam. The system described in relation to FIGS. 19 and 20 functions equivalently and simultaneously for beams originating from both input sources to device 135 of FIG. 17, even though the incident beam angles are different and the polarization states of each beam are orthogonal.

In a further embodiment (not shown), two MEMS mirrors are implemented with one MEMS positioned to correct the trajectories for beams from Source A and the other MEMS positioned to correct the trajectories for beams from Source B. In other embodiments, active correcting elements other than MEMs mirrors are utilized. By way of example, in one embodiment, a LCOS device is used in place of MEMS mirror 137 and is configured to provide equivalent steering of the optical beams.

The active control systems described above are not limited to the specific embodiments in which it is described. It will be appreciated that substantially similar active control systems are able to be implemented into the other embodiments described in this application, as well as other optical switching devices generally.

It will be appreciated that in other embodiments, combinations of the features described in the above embodiments can be used. By way of example, in one other embodiment, beams from independent devices are input perpendicularly, and are also offset in the y-dimension.

The person skilled in the art will appreciate that the principles described above in relation to the dual source embodiments are also applicable to optical switches incorporating a single source or more than two independent sources.

Conclusions

It will be appreciated that the disclosure above provides various significant WSS devices. In particular, the embodiments described herein are adapted to efficiently couple optical beams between predefined input and output ports while substantially restricting the internal back-reflection to other input ports. This improved port selectivity reduces the interference effects introduced by the WSS device and improves the overall device performance. Further, with the improved port selectivity, there is no need to implement isolator arrays on the input ports. This brings down size, and cost of the WSS, as well as reducing overall optical loss.

Some embodiments are reconfigurable, allowing the interchange of input and output ports. Further, some embodiments are adapted to provide a dual source WSS architecture providing the simultaneous and/or bidirectional switching of two optical sources. In these dual source architectures, the beams from the two sources are propagated internally with orthogonal polarization states and processed separately at the switching matrix. This allows the beams to be transmitted along spatially confined or overlapping optical paths. This reduces the need for relatively large physical separation of the beams in the device, thereby reducing the necessary physical dimensions of the WSS device compared to other known dual source WSS devices.

Dual source embodiments of the invention are adapted to provide increased isolation of the beams at the LCOS device by applying a spatial offset to the beams at the front-end of the device. Some embodiments are also adapted to provide active correction of beam trajectories so as to compensate for beam misalignments due to thermal and mechanical aberrations in the WSS.

Interpretation

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid element display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

I claim:

1. A dual-source wavelength selective switch comprising:
  a) a first source comprising a first plurality of ports and carrying a first group of beams and a second source comprising a second plurality of ports and carrying a second group of beams;
  b) a first and second polarizing port selecting module element, the first source transmitting a plurality of beams from the first group of beams to the first polarizing port selecting module element and the second source transmitting a plurality of beams from the second group of beams to the second polarizing port selecting module element, the first and second polarizing port selecting module elements generating a respective first and second output beam that are orthogonally polarized;
  c) a first beam confining module coupled to the first and second polarizing port selecting module elements, the first beam confining module confining and realigning the first and second output beam that are orthogonally polarized along a direction of propagation to generate confined and realigned orthogonally polarized beams;
  d) a collimating element positioned in the path of the confined and realigned orthogonally polarized beams;
  e) a wavelength dispersive element positioned in the path of the confined and realigned orthogonally polarized beams for spatially dispersing individual wavelength channels;
  f) a focusing element positioned in the path of the confined and realigned orthogonally polarized beams for focusing the beams;
  g) a first polarization beam splitter coupled to the focusing element for separating at least one of the first and second output beams that are orthogonally polarized into first and second orthogonal polarization components; and
  h) a processing device positioned in the path of the confined and realigned orthogonally polarized beams that includes a series of independent wavelength processing elements for separately processing each of the spatially dispersed individual wavelength channels thereby steering the spatially dispersed individual wavelength channels along predetermined paths such that the first source is configured to switch an optical beam from one of the first plurality of ports to another one of the first plurality of ports and independently the second source is configured to switch an optical beam from one of the second plurality of ports to another one of the second plurality of ports.

2. The dual-source wavelength selective switch of claim 1 wherein the confined and realigned first and second output beam that are orthogonally polarized along the direction of propagation propagate parallel to each other.

3. The dual-source wavelength selective switch of claim 2 wherein the confined and realigned first and second output beam that are orthogonally polarized along the direction of propagation propagate with a predefined spacing.

4. The dual-source wavelength selective switch of claim 1 wherein the first and second sources are positioned parallel to each other.

5. The dual-source wavelength selective switch of claim 1 wherein the first and second sources are positioned at an angle relative to each other.

6. The dual-source wavelength selective switch of claim 1 wherein the processing device comprises an LCOS device.

7. The dual-source wavelength selective switch of claim 1 wherein the collimating element comprises a collimating lens positioned in the path of the confined and realigned orthogonally polarized beams.

8. The dual-source wavelength selective switch of claim 1 wherein the collimating element comprises an optical power element.

9. A wavelength selective switch comprising:
  a) one or more input ports for inputting optical beams in a forward direction of propagation;
  b) a switching module for reflecting the optical beams propagating in the forward direction and selectively switching the optical beams along predetermined paths in a return direction of propagation;
  c) one or more output ports for receiving predetermined optical beams propagating in the return direction; and
  d) a port selecting module comprising a beam shifting element configured to shift the optical beams by a predetermined beam displacement, configured to correct an offset of the optical beams, and configured such that unwanted light from the switching module is not coupled to an output port, the port selecting module selectively directing the optical beams such that predetermined ones of the optical beams propagating in the return direction propagate along trajectories out of alignment with the input ports.

10. The wavelength selective switch of claim 9 wherein the beam shifting element is configured such that a wanted light from the switching module is coupled to an output port.

11. The wavelength selective switch of claim 9 wherein the beam shifting element comprises an optical wedge.

12. The wavelength selective switch of claim 9 wherein the beam shifting element comprises a beam compensator.

13. The wavelength selective switch of claim 9 wherein the predetermined beam displacement is substantially 125 µm.

14. A wavelength selective switch comprising:
   a) one or more input ports for inputting optical beams in a forward direction of propagation;
   b) a switching module for reflecting optical beams propagating in the forward direction and selectively switching the optical beams along predetermined paths in a return direction of propagation;
   c) one or more output ports for receiving predetermined optical beams propagating in the return direction; and
   d) a port selecting module comprising a first and second birefringent wedge wherein a crystalline optic axis of the first birefringent wedge is oriented orthogonal to a crystalline optic axis of the second birefringent wedge, the port selecting module selectively directing the optical beams such that predetermined ones of the optical beams propagating in the return direction propagate along trajectories out of alignment with the input ports and the port selecting module preventing unwanted light from the switching module from coupling to an output port.

* * * * *